(12) United States Patent
Kim et al.

(10) Patent No.: US 12,114,348 B2
(45) Date of Patent: Oct. 8, 2024

(54) METHOD FOR TRANSMITTING/RECEIVING UPLINK CHANNEL IN WIRELESS COMMUNICATION SYSTEM, AND APPARATUS THEREFOR

(71) Applicant: LG ELECTRONICS INC., Seoul (KR)

(72) Inventors: Hyungtae Kim, Seoul (KR); Inkwon Seo, Seoul (KR); Jiwon Kang, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 316 days.

(21) Appl. No.: 17/635,660

(22) PCT Filed: Aug. 14, 2020

(86) PCT No.: PCT/KR2020/010877
§ 371 (c)(1),
(2) Date: Feb. 15, 2022

(87) PCT Pub. No.: WO2021/029738
PCT Pub. Date: Feb. 18, 2021

(65) Prior Publication Data
US 2022/0287054 A1  Sep. 8, 2022

Related U.S. Application Data

(60) Provisional application No. 62/887,604, filed on Aug. 15, 2019.

(30) Foreign Application Priority Data

Oct. 3, 2019 (KR) .......................... 10-2019-0122708
Oct. 10, 2019 (KR) .......................... 10-2019-0125706

(51) Int. Cl.
| | | |
|---|---|---|
| *H04W 72/566* | (2023.01) | |
| *H04W 72/21* | (2023.01) | |
| *H04W 72/23* | (2023.01) | |

(52) U.S. Cl.
CPC .......... *H04W 72/569* (2023.01); *H04W 72/21* (2023.01); *H04W 72/23* (2023.01)

(58) Field of Classification Search
CPC ... H04W 72/569; H04W 72/21; H04W 72/23; H04W 72/1268; H04L 5/001;
(Continued)

(56) References Cited

U.S. PATENT DOCUMENTS

2019/0052343 A1  2/2019  Li et al.
2019/0230683 A1  7/2019  Akkarakaran et al.
(Continued)

FOREIGN PATENT DOCUMENTS

| EP | 3059995 | 8/2016 | |
|---|---|---|---|
| WO | 2017099556 | 6/2017 | |
| WO | WO-2020146247 A3 * | 8/2020 | ........... H04L 1/1812 |

OTHER PUBLICATIONS

PCT International Application No. PCT/KR2020/010877, International Search Report dated Nov. 24, 2020, 6 pages.
(Continued)

*Primary Examiner* — Thai Nguyen
(74) *Attorney, Agent, or Firm* — LEE, HONG, DEGERMAN, KANG & WAIMEY

(57) ABSTRACT

A method of transmitting and receiving an uplink channel in a wireless communication system and a device therefor are disclosed. Specifically, a method of transmitting an uplink channel by a user equipment (UE) includes receiving first downlink control information (DCI) based on a first control resource set group; wherein a first uplink channel is scheduled based on the first DCI; receiving second DCI based on
(Continued)

a second control resource set group; wherein a second uplink channel is scheduled based on the second DCI; and transmitting only one of the first uplink channel and the second uplink channel based on overlapping of a resource of the first uplink channel and a resource of the second uplink channel, wherein the first or the second uplink channel is dropped based on a priority rule, and a priority of the priority rule is determined based on contents of information included in each uplink channel.

17 Claims, 15 Drawing Sheets

(58) Field of Classification Search
CPC ... H04L 5/0064; H04L 5/0053; H04L 1/1861; H04L 1/1887; H04L 1/0031
See application file for complete search history.

(56) References Cited

U.S. PATENT DOCUMENTS

2020/0229104 A1* 7/2020 MolavianJazi ..... H04W 52/146
2020/0296701 A1* 9/2020 Park ...................... H04L 1/1896

OTHER PUBLICATIONS

Intel Corporation, "On multi-TRP/multi-panel transmission," 3GPP TSG-RAN WG1 #96bis, R1-1904313, Mar. 2019, 17 pages.
Vivo, "Further Discussion on Multi-TRP Transmission," 3GPP TSG-RAN WG1 #96bis, R1-1904096, Mar. 2019, 14 pages.
NTT Docomo, Inc, "Enhancements on multi-TRP/panel transmission," 3GPP TSG-RAN WG1 #97, R1-1906224, May 2019, 32 pages.

* cited by examiner

[FIG. 1]
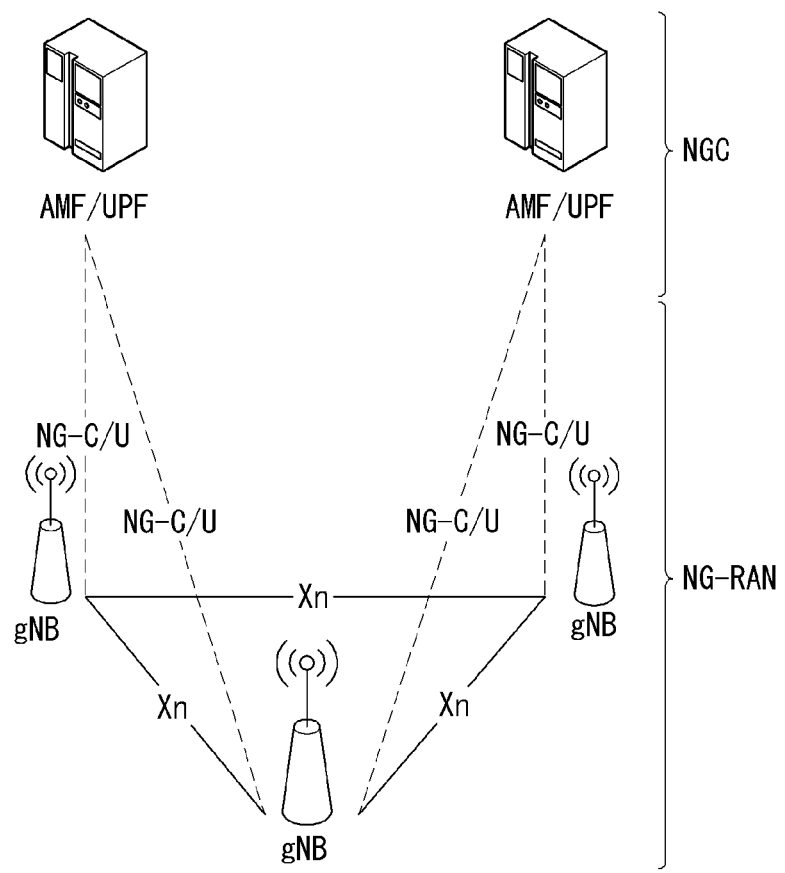
[FIG. 2]
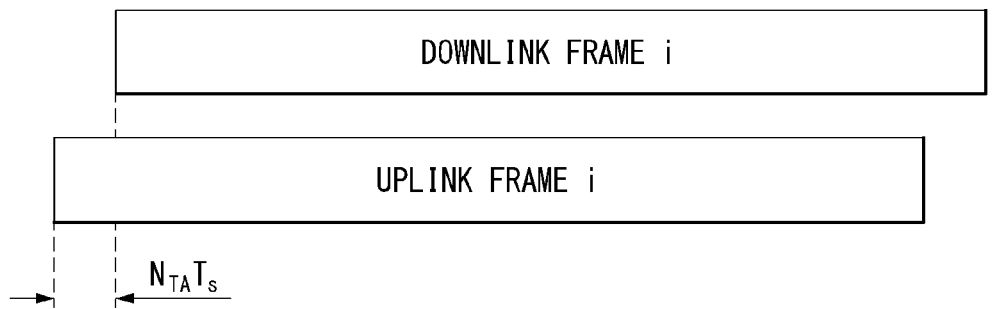

[FIG. 3]
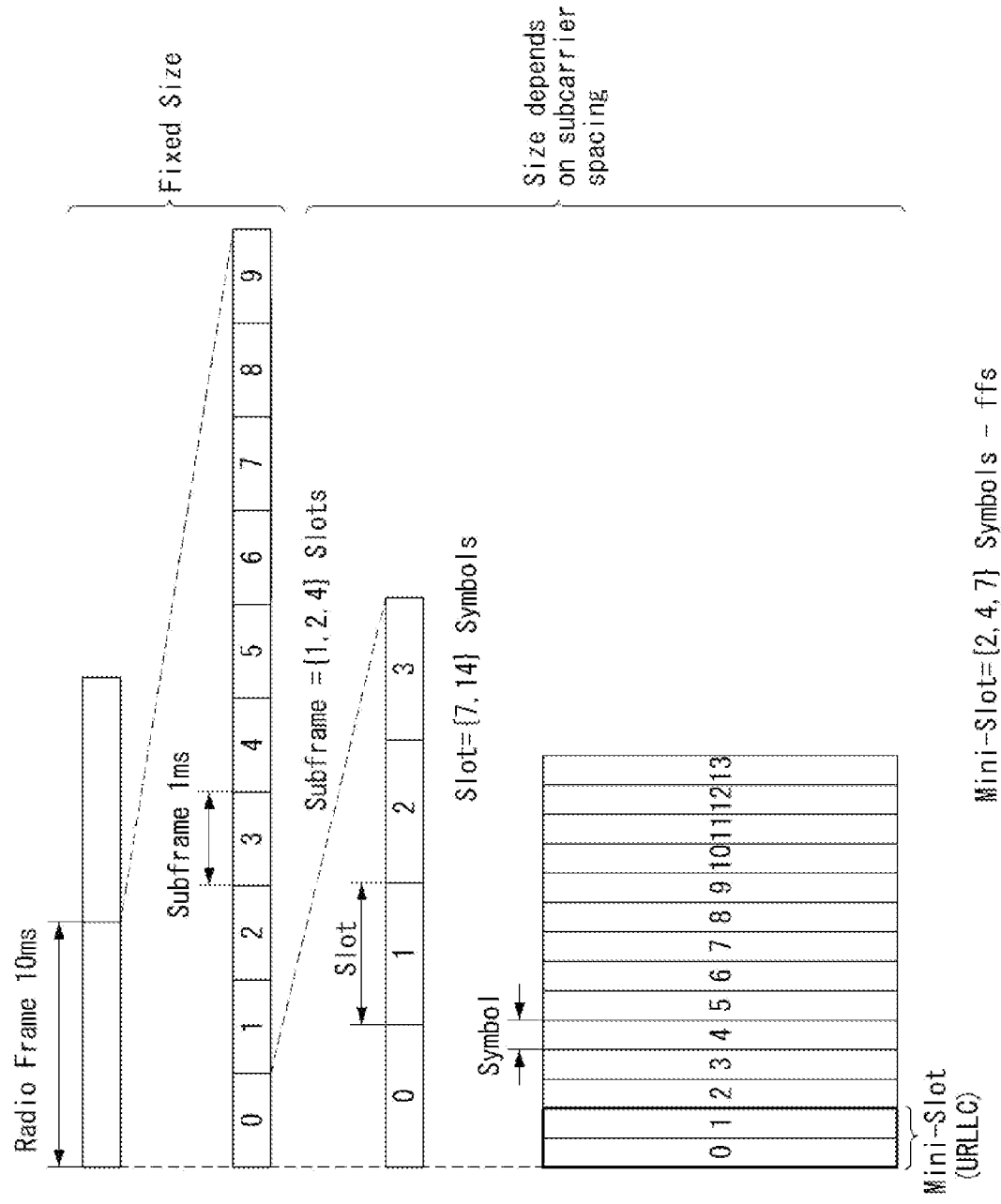

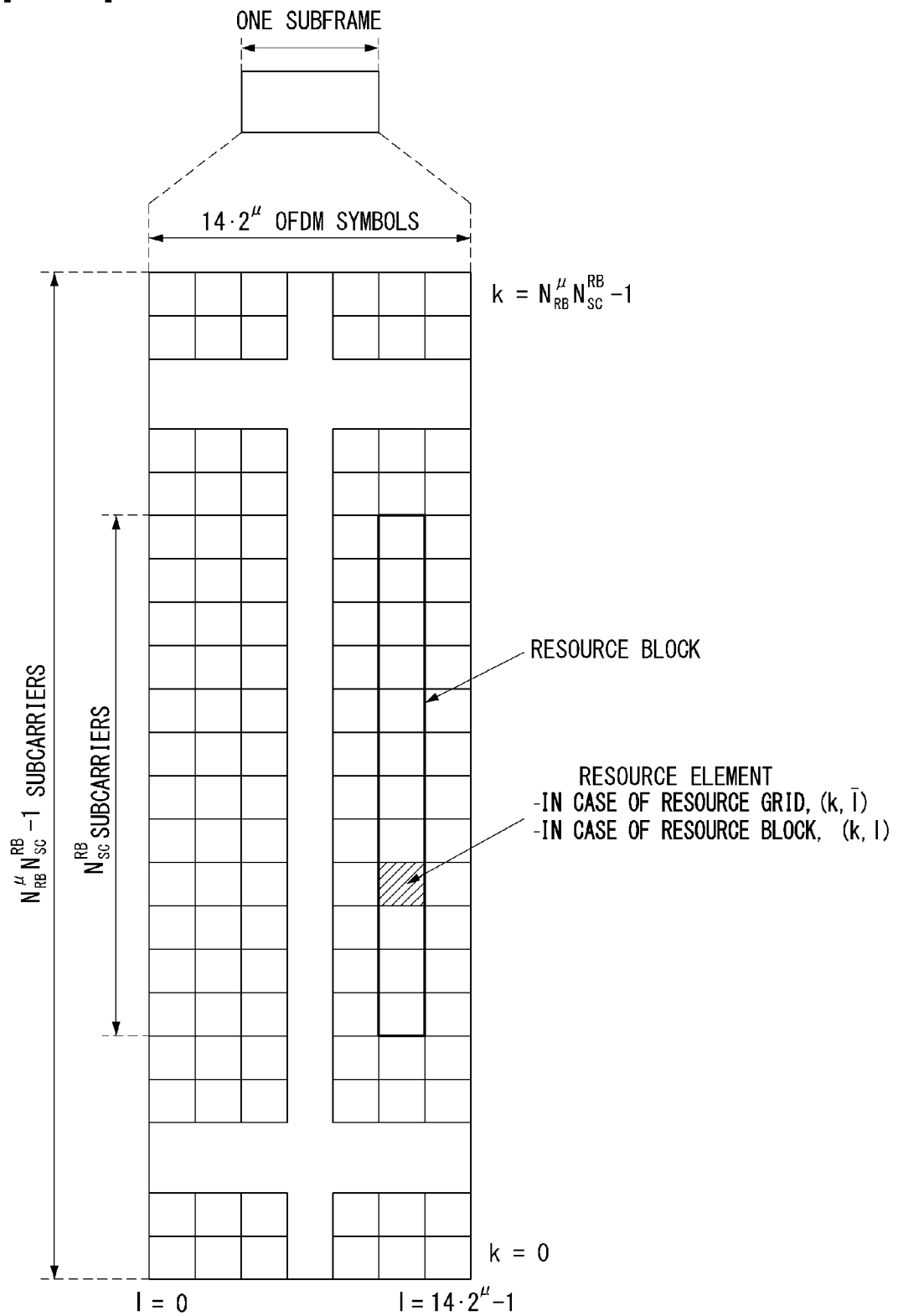
[FIG. 4]

[FIG. 5]
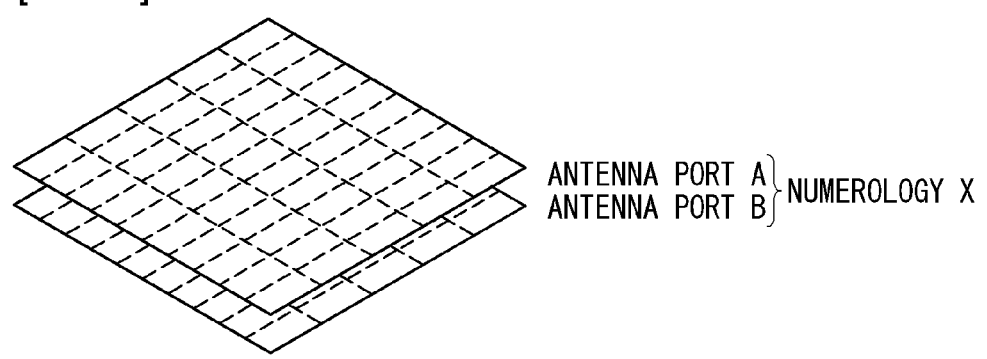
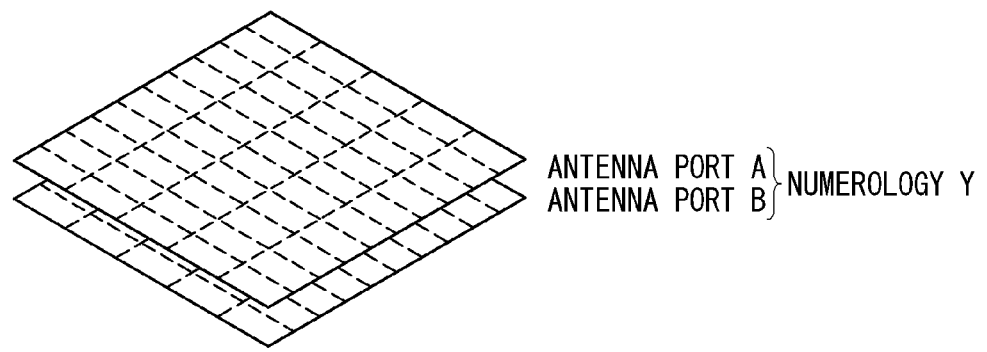

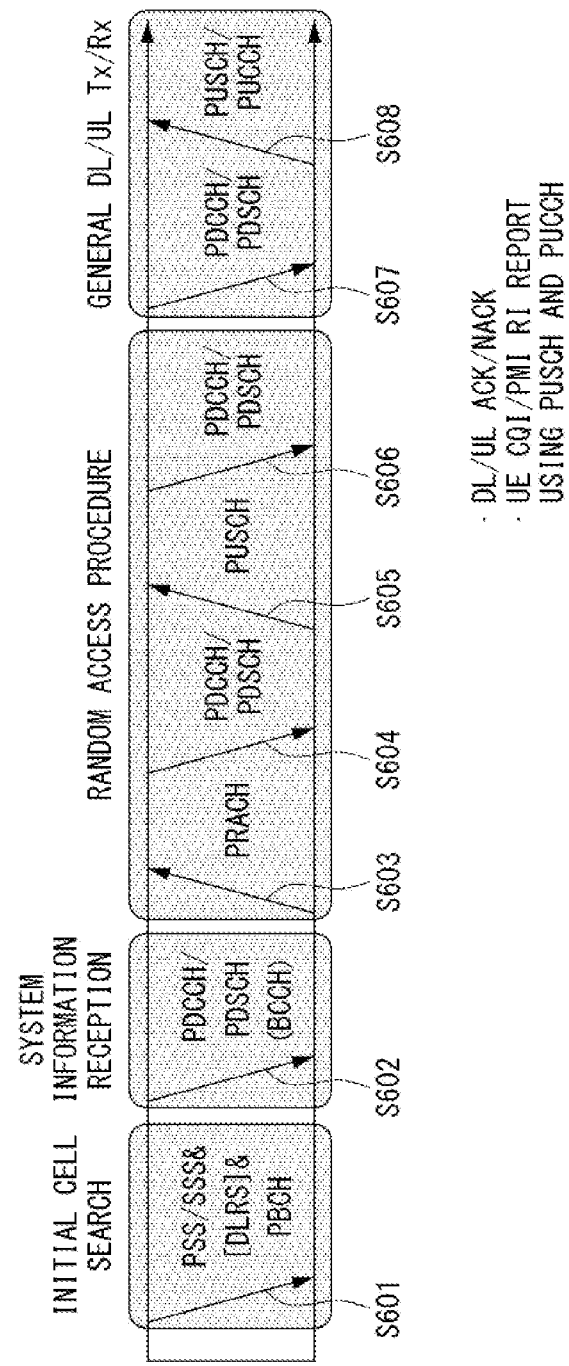
[FIG. 6]

[FIG. 7]
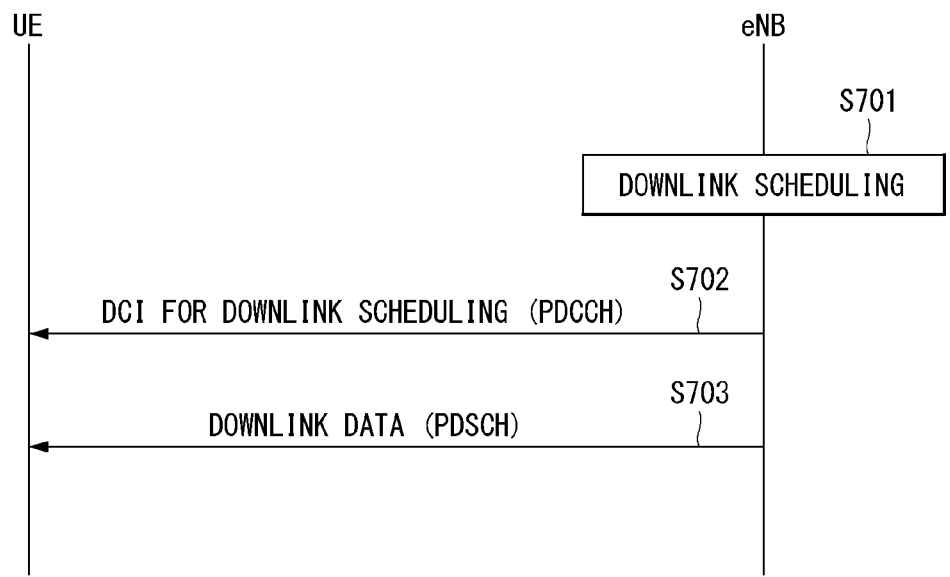
[FIG. 8]
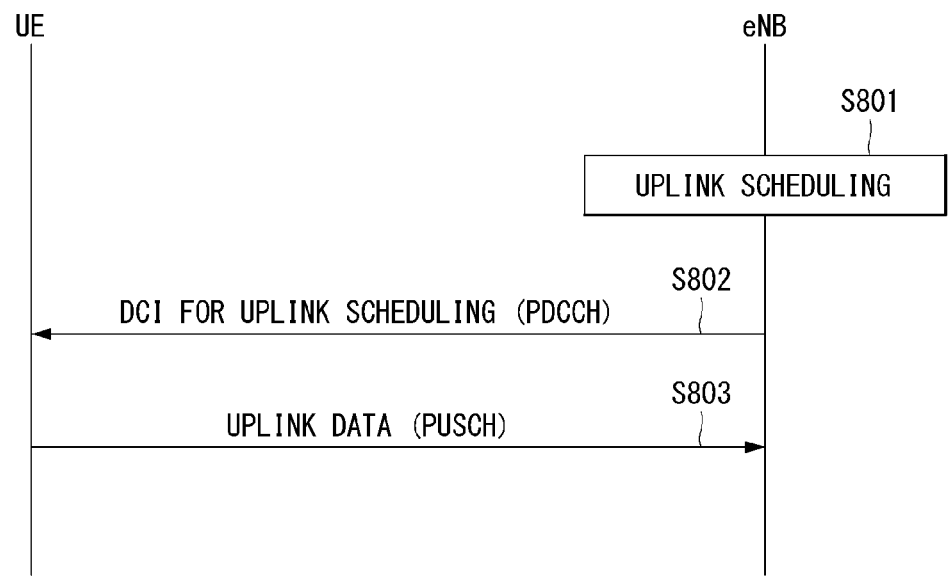

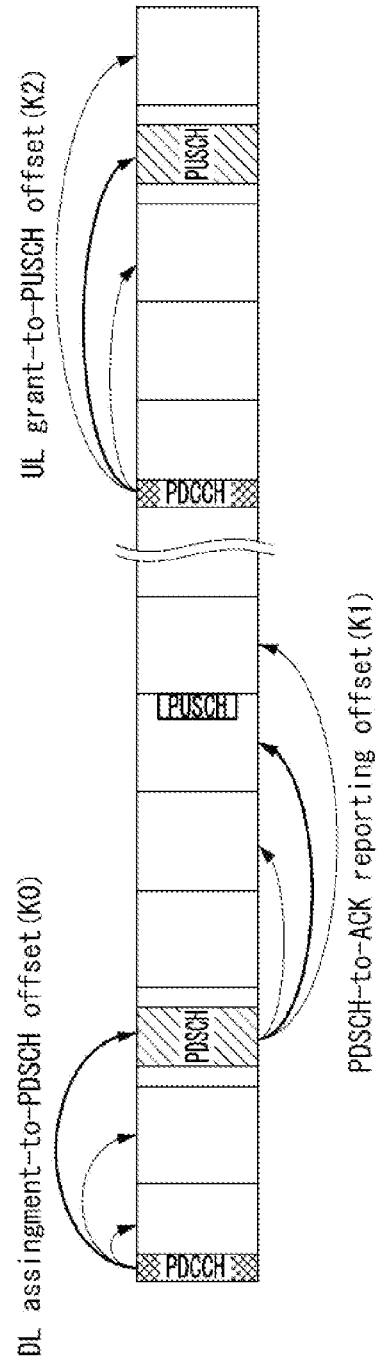
[FIG. 9]

[FIG. 10]
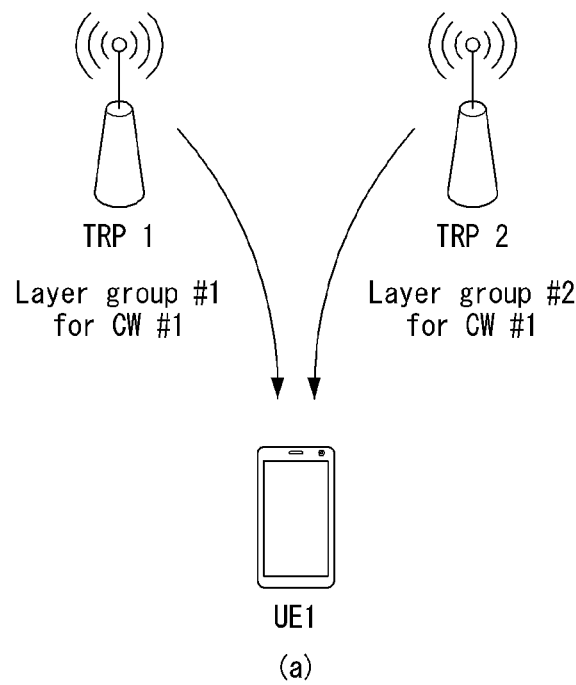
(a)
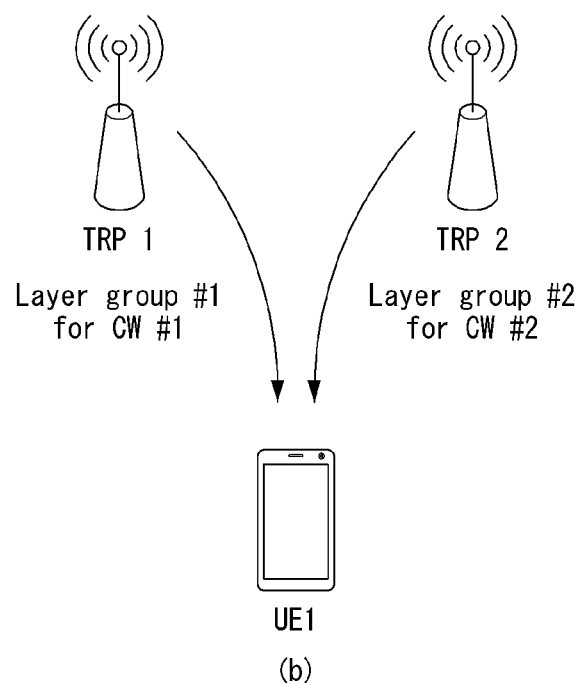
(b)

[FIG. 11]
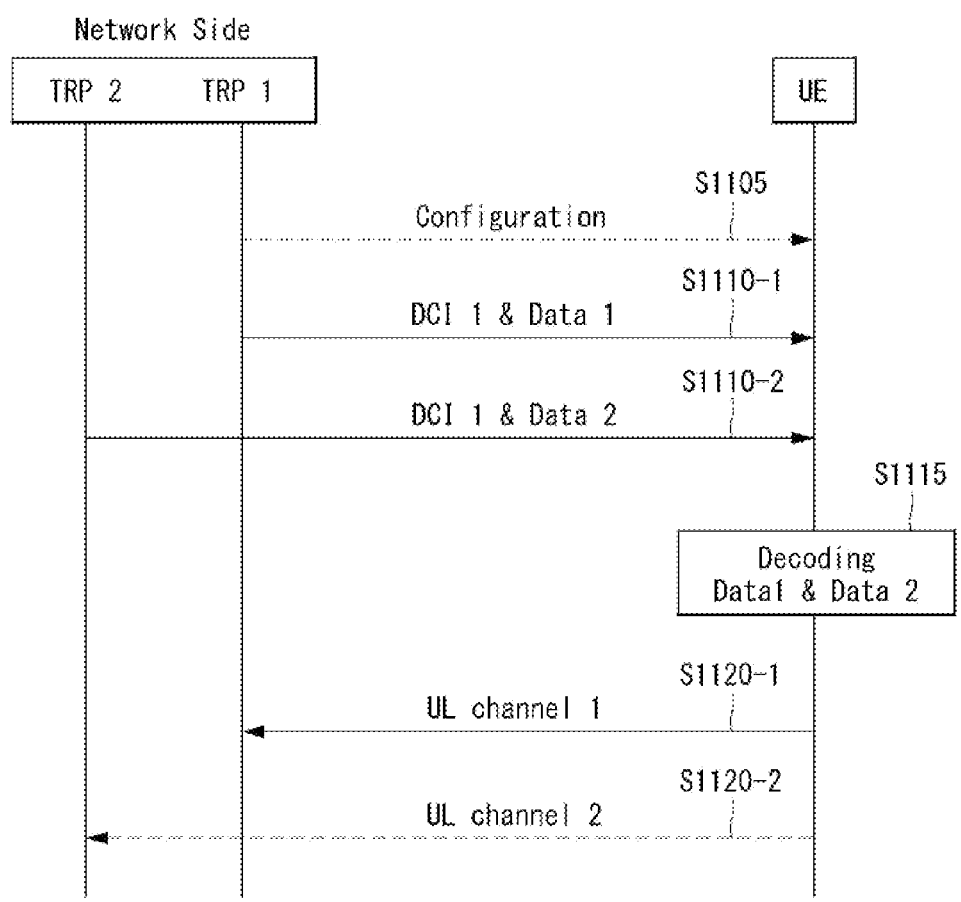

[FIG. 12]
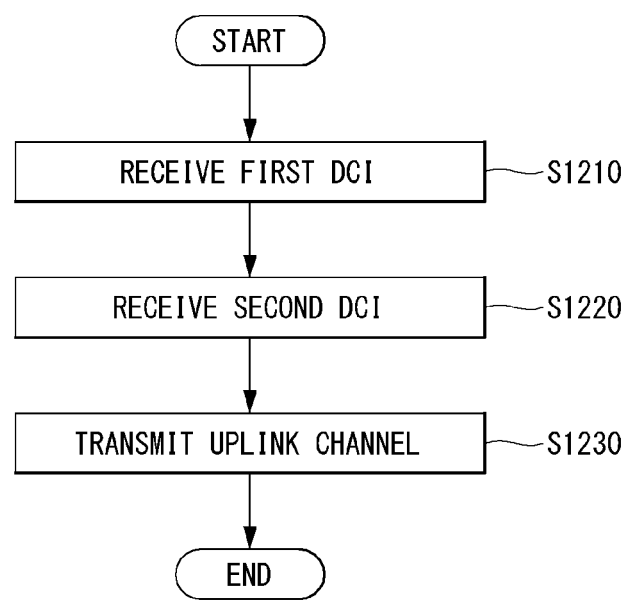

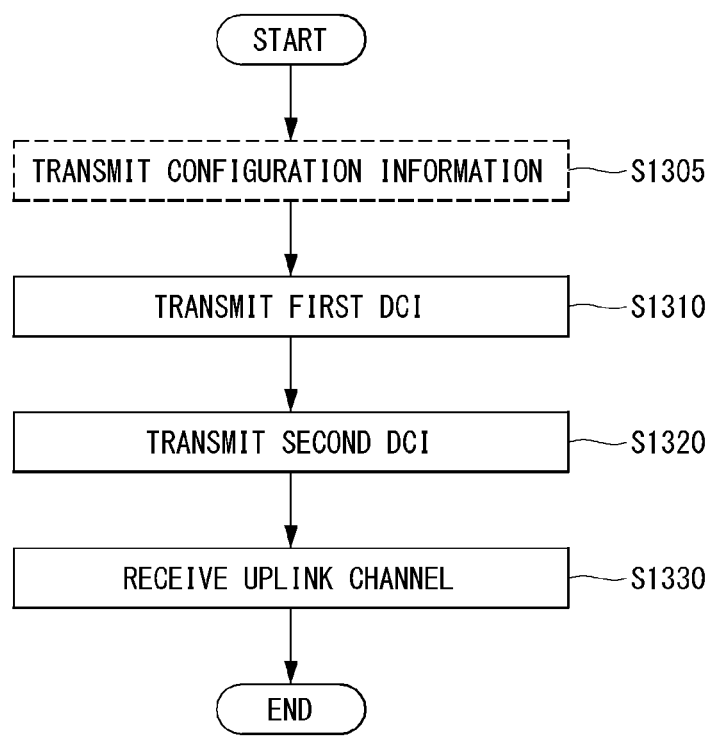
[FIG. 13]

[FIG. 14]
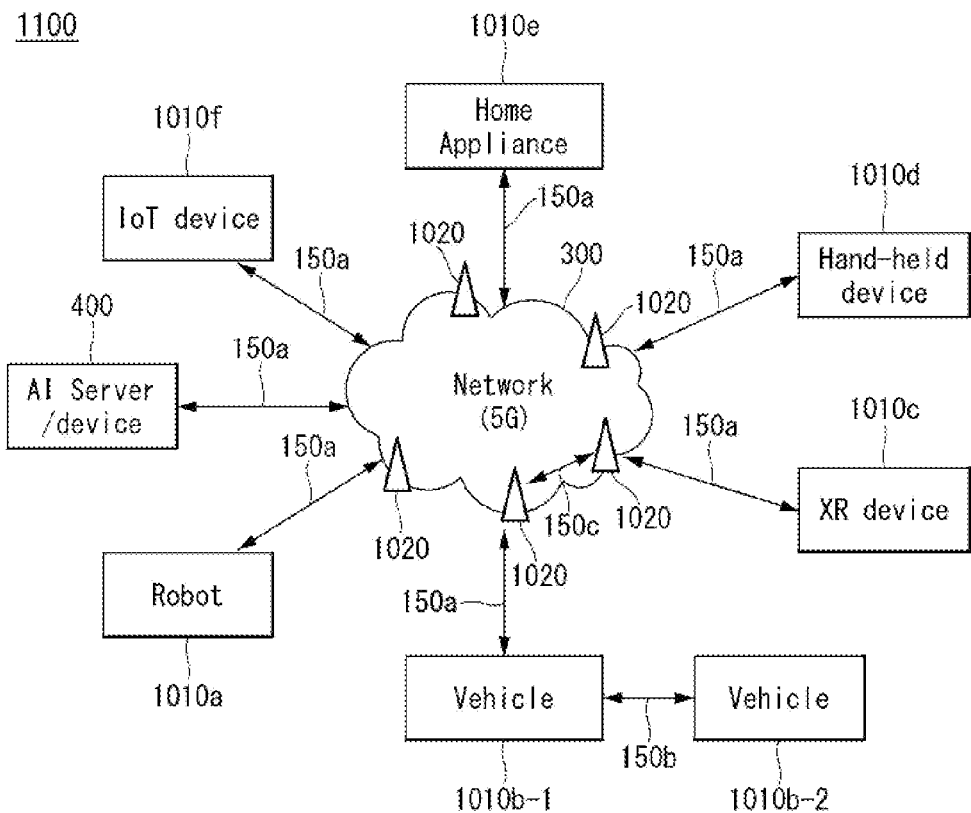
[FIG. 15]
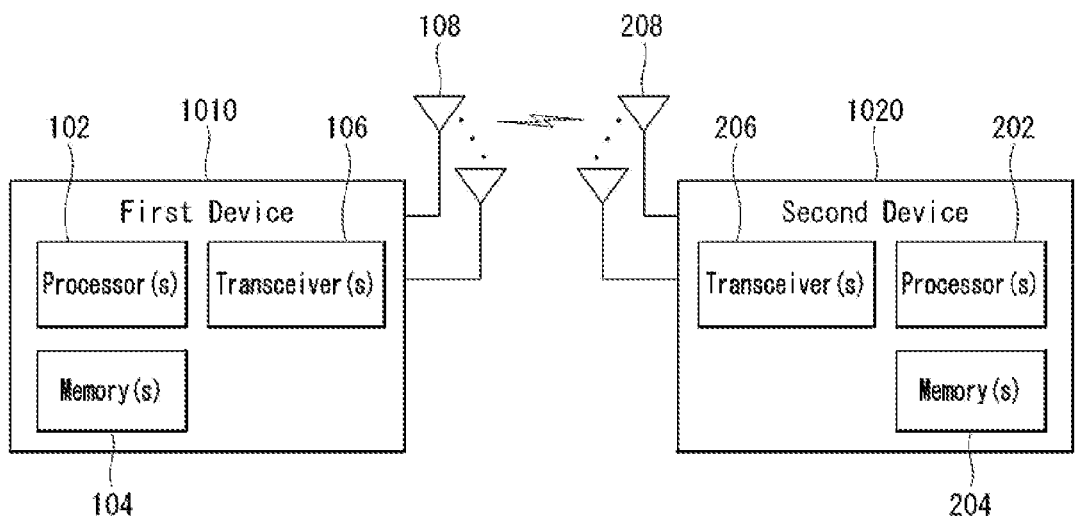

[FIG. 16]
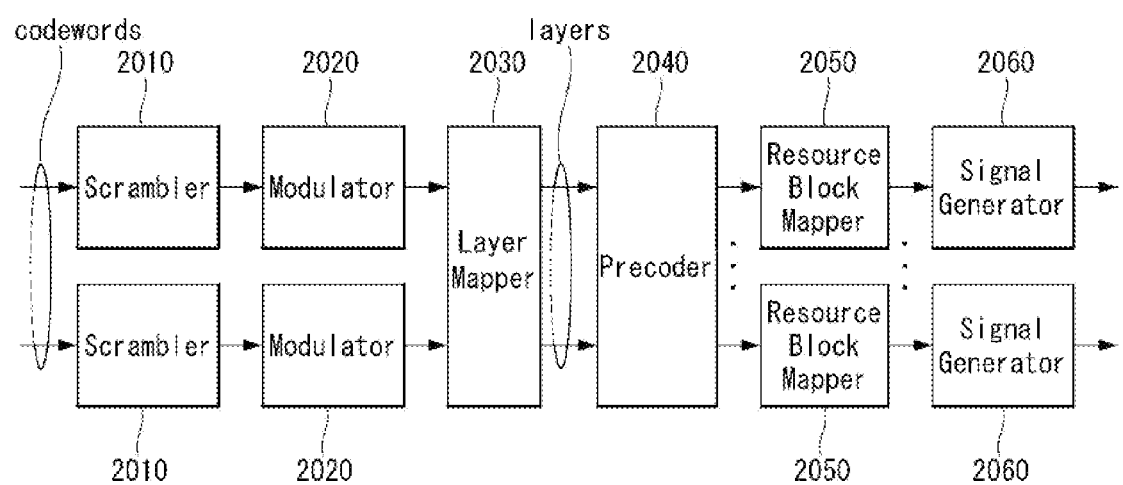

[FIG. 17]
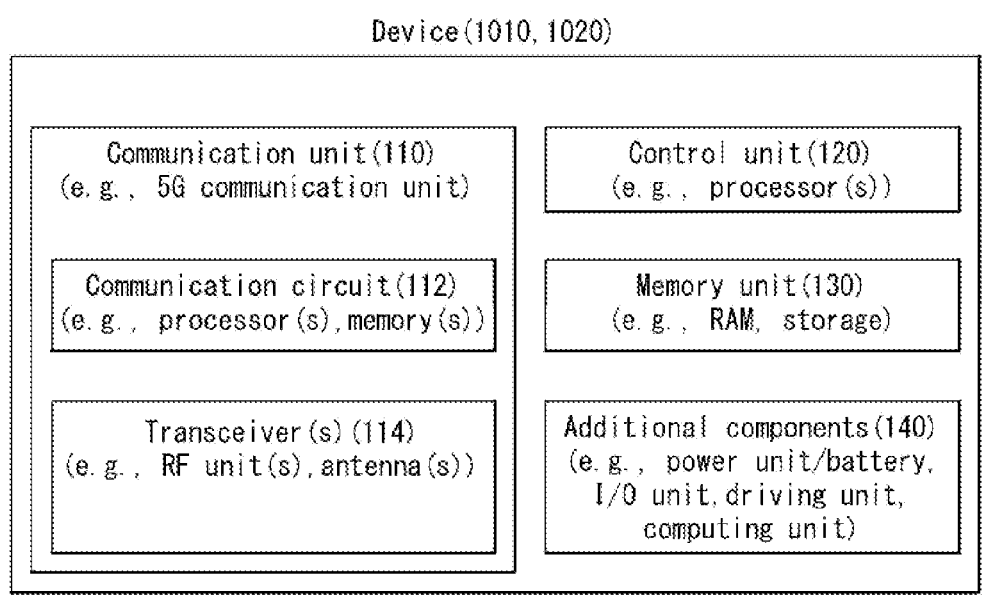

[FIG. 18]
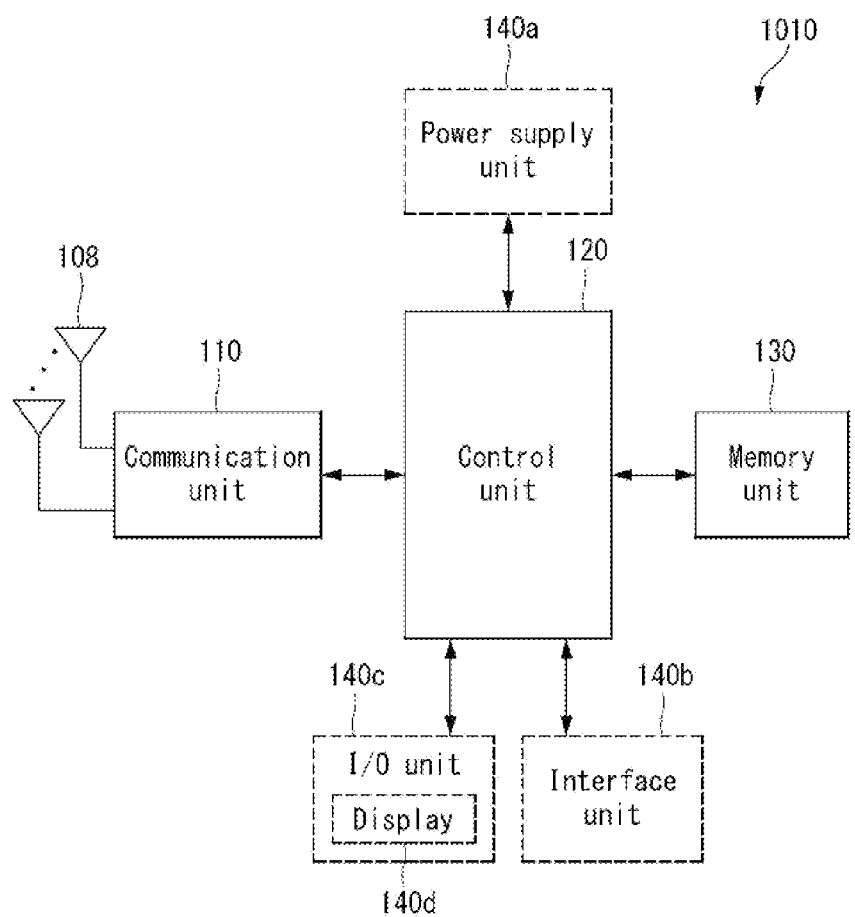

METHOD FOR TRANSMITTING/RECEIVING UPLINK CHANNEL IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2020/010877, filed on Aug. 14, 2020, which claims the benefit of earlier filing date and right of priority to Korean Application Nos. 10-2019-0122708, filed on Oct. 3, 2019, and 10-2019-0125706 filed on Oct. 10, 2019, and also claims the benefit of U.S. Provisional Application No. 62/887,604, filed on Aug. 15, 2019, the contents of which are all incorporated by reference herein in their entirety.

TECHNICAL FIELD

The present disclosure relates to a wireless communication system, and more particularly, to a method of transmitting and receiving an uplink channel based on multiple transmission reception points (TRPs) and a device supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

DISCLOSURE

Technical Problem

The present disclosure proposes a method in which a UE supported by multiple transmission reception points (TRPs) transmits or receives an uplink channel in a wireless communication system.

Specifically, the present disclosure proposes a method of transmitting and receiving an uplink channel including uplink control information for multiple TRPs.

In addition, the present disclosure proposes a method of dividing multiple TRPs based on CORESET/CORESET group, and dividing UCIs related to each TRP.

In addition, the present disclosure proposes a method of defining a PUCCH resource group. In addition, the present disclosure proposes a method of dividing TRP and a method of determining a PUCCH resource for UCI transmission based on a PUCCH resource group.

In addition, the present disclosure proposes a multiplexing/drop method when overlapping/collision of uplink channel (for example, PUCCH/PUSCH) resources for each TRP occurs in multiple DCI-based MTRP transmissions.

In addition, the present disclosure proposes a method of setting a priority rule related to a multiplexing/drop operation when overlapping of uplink channel resources occurs.

In addition, the present disclosure proposes a method of detecting DCI for scheduling MTRP transmission.

In addition, the present disclosure proposes a method of setting a timing parameter related to HARQ-ACK report.

In addition, the present disclosure proposes a method of defining a PUCCH group for spatial relation application and updating spatial relation information for the PUCCH group.

Technical objects to be achieved by the present disclosure are not limited to the aforementioned technical objects, and other technical objects not described above may be evidently understood by a person having ordinary skill in the art to which the present disclosure pertains from the following description.

Technical Solution

A method of transmitting an uplink channel by a user equipment (UE) in a wireless communication system include: receiving first downlink control information (DCI) based on a first control resource set group, in which a first uplink channel is scheduled based on the first DCI; receiving second DCI based on a second control resource set group, in which a second uplink channel is scheduled based on the second DCI; and transmitting only one of the first uplink channel and the second uplink channel based on overlapping of a resource of the first uplink channel and a resource of the second uplink channel, in which the first uplink channel or the second uplink channel may be dropped based on a priority rule, and a priority of the priority rule may be determined based on contents of information included in each uplink channel.

The first uplink channel and the second uplink channel may be physical uplink control channels.

By comparing first contents with a highest priority among contents of information included in the first uplink channel and second contents with a highest priority among contents of information included in the second uplink channel, an uplink channel including contents related to a higher priority may be transmitted, and an uplink channel including contents related to a lower priority may be dropped.

When the priorities of the first contents and the second contents are the same, an uplink channel related to a lower index may be transmitted based on indexes of each control resource set group.

By comparing the number of serving cells related to contents of information included in the first uplink channel with the number of serving cells related to contents of information included in the second uplink channel, uplink channels related to more serving cells may be transmitted, and uplink channels related to fewer serving cells may be dropped.

Each uplink channel may include at least one of a beam failure recovery request, HARQ-ACK information, a scheduling request, and/or channel state information.

The beam failure recovery request may have a highest priority.

The method may further include: receiving configuration information related to the first uplink channel and the second uplink channel, in which a resource group of a PUCCH may be configured based on the configuration information, and the resource group may be related to one or more PUCCH resource sets.

The first uplink channel may be a physical uplink control channel, and the second uplink channel may be a physical uplink shared channel.

The second uplink channel may be dropped based on the overlapped resource area being greater than or equal to a specific ratio or a specific number.

The first uplink channel may be dropped based on the second uplink channel including an SPS PUSCH or RACH related message.

The first uplink channel may be dropped based on the first uplink channel being repeatedly transmitted.

A user equipment (UE) transmitting an uplink channel in a wireless communication system includes: one or more transceivers; one or more processors; and one or more memories configured to store instructions for operations executed by the one or more processors and be connected to the one or more processors, in which the operations may include receiving first downlink control information (DCI) based on a first control resource set group, in which a first uplink channel is scheduled based on the first DCI; receiving second DCI based on a second control resource set group, in which a second uplink channel is scheduled based on the second DCI; and transmitting only one of the first uplink channel and the second uplink channel based on overlapping of a resource of the first uplink channel and a resource of the second uplink channel, in which the first uplink channel or the second uplink channel may be dropped based on a priority rule, and a priority of the priority rule may be determined based on contents of information included in each uplink channel.

A method of receiving an uplink channel by a base station (BS) in a wireless communication system includes: transmitting first downlink control information (DCI) based on a first control resource set group to a user equipment (UE), in which a first uplink channel is scheduled based on the first DCI; transmitting second DCI based on a second control resource set group, in which a second uplink channel is scheduled based on the second DCI; and receiving only one of the first uplink channel and the second uplink channel based on overlapping of a resource of the first uplink channel and a resource of the second uplink channel, in which the first uplink channel or the second uplink channel may be dropped based on a priority rule, and a priority of the priority rule may be determined based on contents of information included in each uplink channel.

A base station (BS) receiving an uplink channel in a wireless communication system includes: one or more transceivers; one or more processors; and one or more memories configured to store instructions for operations executed by the one or more processors and be connected to the one or more processors, in which the operations may include transmitting first downlink control information (DCI) based on a first control resource set group to a user equipment (UE), in which a first uplink channel is scheduled based on the first DCI; transmitting second DCI based on a second control resource set group, in which a second uplink channel is scheduled based on the second DCI; and receiving only one of the first uplink channel and the second uplink channel based on overlapping of a resource of the first uplink channel and a resource of the second uplink channel, in which the first uplink channel or the second uplink channel may be dropped based on a priority rule, and a priority of the priority rule may be determined based on contents of information included in each uplink channel.

A device includes one or more memories and one or more processors functionally connected to the one or more memories, in which the one or more processors control the device to receive first downlink control information (DCI) based on a first control resource set group, in which a first uplink channel is scheduled based on the first DCI; receive a second DCI based on a second control resource set group, in which a second uplink channel is scheduled based on the second DCI; and transmit only one of the first uplink channel and the second uplink channel based on overlapping of a resource of the first uplink channel and a resource of the second uplink channel, in which the first uplink channel or the second uplink channel may be dropped based on a priority rule, and a priority of the priority rule may be determined based on contents of information included in each uplink channel.

One or more non-transitory computer-readable media store one or more instructions, in which the one or more instructions executable by the one or more processors includes an instruction that instructs a user equipment (UE) to: receive first downlink control information (DCI) based on a first control resource set group, in which a first uplink channel is scheduled based on the first DCI; receive a second DCI based on a second control resource set group, in which a second uplink channel is scheduled based on the second DCI; and transmit only one of the first uplink channel and the second uplink channel based on overlapping of a resource of the first uplink channel and a resource of the second uplink channel, in which the first uplink channel or the second uplink channel may be dropped based on a priority rule, and a priority of the priority rule may be determined based on contents of information included in each uplink channel.

Advantageous Effects

According to an embodiment of the present disclosure, it is possible to transmit and receive an uplink channel including uplink control information for multiple TRPs.

In addition, according to an embodiment of the present disclosure, it is possible to divide multiple TRPs based on the CORESET/CORESET group, and to divide the UCI related to each TRP.

In addition, according to an embodiment of the present disclosure, it is possible to configure a PUCCH resource group for multiple TRPs, and determine a PUCCH resource for UCI transmission for each TRP based thereon.

In addition, according to an embodiment of the present disclosure, it is possible to transmit UCI by applying multiplexing/dropping based on a priority rule when overlapping/collision of uplink channel resources for MTRPs occurs.

In addition, according to an embodiment of the present disclosure, it is possible to detect DCI for scheduling MTRP transmission.

In addition, according to an embodiment of the present disclosure, it is possible to set a timing parameter related to HARQ-ACK report in consideration of MTRP transmission.

In addition, according to an embodiment of the present disclosure, it is possible to define a PUCCH group for applying a spatial relationship, and simultaneously update spatial relationship information for the PUCCH group.

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 1 is a diagram illustrating an example of an overall system structure of NR to which a method proposed in the disclosure may be applied.

FIG. 2 illustrates a relationship between an uplink frame and a downlink frame in a wireless communication system to which a method proposed in the disclosure may be applied.

FIG. 3 illustrates an example of a frame structure in an NR system.

FIG. 4 illustrates an example of a resource grid supported by a wireless communication system to which a method proposed in the disclosure may be applied.

FIG. 5 illustrates examples of a resource grid for each antenna port and numerology to which a method proposed in the disclosure may be applied.

FIG. 6 illustrates physical channels and general signal transmission.

FIG. 7 illustrates an example of a downlink transmission/reception operation.

FIG. 8 illustrates an example of an uplink transmission/reception operation.

FIG. 9 illustrates an example of HARQ-ACK timing (K1).

FIG. 10 illustrates an example of a transmission/reception method for improving reliability using transmission in multiple TRPs.

FIG. 11 illustrates an example of a signaling procedure for performing data transmission and reception between a network side and a user equipment (UE) in a situation of multiple TRPs to which the method and/or embodiments proposed in the present disclosure may be applied.

FIG. 12 illustrates an example of an operation flowchart of a UE performing transmission/reception of an uplink channel to which the method and/or embodiment proposed in the present disclosure may be applied.

FIG. 13 illustrates an example of an operation flowchart of a base station performing transmission/reception of an uplink channel to which the method and/or embodiment proposed in the present disclosure may be applied.

FIG. 14 illustrates a communication system applied to the disclosure.

FIG. 15 illustrates a wireless device which may be applied to the disclosure.

FIG. 16 illustrates a signal processing circuit for a transmit signal.

FIG. 17 illustrates another example of a wireless device applied to the disclosure.

FIG. 18 illustrates a portable device applied to the disclosure.

MODE FOR INVENTION

Reference will now be made in detail to embodiments of the disclosure, examples of which are illustrated in the accompanying drawings. A detailed description to be disclosed below together with the accompanying drawing is to describe exemplary embodiments of the disclosure and not to describe a unique embodiment for carrying out the disclosure. The detailed description below includes details to provide a complete understanding of the disclosure. However, those skilled in the art know that the disclosure may be carried out without the details.

In some cases, in order to prevent a concept of the disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (VVT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the disclosure is described based on the 3GPP communication system (e.g., LTE-A or NR), but the technical spirit of the disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the disclosure may be referred to for a background art, terms, omissions, etc., used for describing the disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane.

Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15 [kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$ and $N_f=4096$. DL and UL transmission is configured as a radio frame having a section of $T_f=(\Delta f_{max} N_f/100) \cdot T_s=10$ ms. The radio frame is composed of ten sub-frames each having a section of $T_{sf}=(\Delta f_{max} N_f/1000) \cdot T_s=1$ ms. In this case, there may be a set of UL frames and a set of DL frames.

FIG. 2 illustrates a relation between an uplink frame and a downlink frame in a wireless communication system to which a method proposed in the disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the disclosure is applicable.

Each element of the resource grid for the numerology μ and the antenna port p is called a resource element and is uniquely identified by an index pair (k,l), where k=0, ..., $N_{RB}^\mu N_{sc}^{RB}-1$ is an index on a frequency domain, and l=0, ..., $2^\mu N_{symb}^{(\mu)}-1$ refers to a location of a symbol in a subframe. The index pair (k,l) is used to refer to a resource element in a slot, where l=0, ..., $N_{symb}^{(\mu)}-1$.

The resource element (k, l) for the numerology μ and the antenna port p corresponds to a complex value $a_{k,l}^{(p,\mu)}$. When there is no risk for confusion or when a specific antenna port or numerology is not specified, the indices p and μ may be dropped, and as a result, the complex value may be $a_{k,l}^{(p)}$ or $a_{k,l}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^{\mu}$ in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$ where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \quad \text{[Equation 2]}$$

Here, $N_{BWP,i}^{start}$ may be the common resource block where the BWP starts relative to the common resource block 0.

Bandwidth Part (BWP)

The NR system may support up to 400 MHz per component carrier (CC). If a UE which operates in wideband CC operates while continuously turning on RF for all CCs, UE battery consumption may increase. Alternatively, when several use cases (e.g., eMBB, URLLC, mMTC, V2X, etc.) which operate in one wideband CC are considered, different numerologies (e.g., sub-carrier spacing) may be supported for each frequency band in the corresponding CC. Alternatively, a capability for the maximum bandwidth may vary for each UE. By considering this, the BS may instruct the UE to operate only in a partial bandwidth rather than the entire bandwidth of the wideband CC and intends to define the corresponding partial bandwidth as the bandwidth part (BWP) for convenience. The BWP may consist of consecutive resource blocks (RBs) on the frequency axis and may correspond to one numerology (e.g., sub-carrier spacing, CP length, slot/mini-slot duration).

A base station may configure multiple BWPs even within one CC configured to the UE. As one example, a BWP occupying a relatively small frequency domain may be configured in a PDCCH monitoring slot, and a PDSCH indicated in PDCCH may be scheduled onto a BWP larger than this. Alternatively, when UEs are concentrated on a specific BWP, some UEs may be configured with other BWPs for load balancing. Alternatively, considering frequency domain inter-cell interference cancellation between neighboring cells, a partial spectrum of the entire bandwidth may be excluded and both BWPs may be configured even in the same slot. That is, the base station may configure at least one DL/UL BWP to the UE associated with the wideband CC and may activate at least one DL/UL BWP (by L1 signaling or MAC CE or RRC signaling) among configured DL/UL BWP(s) at a specific time, and switching may be indicated to another configured DL/UL BWP (by L1 signaling or MAC CE or RRC signaling) or a timer value may be switched to the fixed DL/UL BWP when a timer value is expired based on a timer. In this case, the activated DL/UL BWP is defined as an active DL/UL BWP. However, in a situation in which the UE is in an initial access process or before RRC connection is set up, the UE may not receive a configuration for the DL/UL BWP and in such a situation, the DL/UL BWP assumed by the UE is defined as an initial active DL/UL BWP.

Physical Channel and General Signal Transmission

FIG. 6 illustrates physical channels and general signal transmission. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

For example, in an NR system, DCI format 0_0 and DCI format 0_1 are used for scheduling of PUSCH in one cell, and DCI format 1_0 and DCI format 1_1 are used for scheduling PDSCH in one cell. Information included in DCI format 0_0 is CRC scrambled by C-RNTI or CS-RNTI or MCS-C-RNTI and transmitted. And, DCI format 0_1 is used for reserving PUSCH in one cell. Information included in DCI format 0_1 may be CRC scrambled by C-RNTI or CS-RNTI or SP-CSI-RNTI or MCS-C-RNTI and transmitted. DCI format 1_0 is used for scheduling PDSCH in one DL cell. Information included in DCI format 1_0 is CRC scrambled by C-RNTI or CS-RNTI or MCS-C-RNTI and transmitted. DCI format 1_1 is used for scheduling PDSCH in one cell. Information included in DCI format 1_1 is CRC scrambled by C-RNTI or CS-RNTI or MCS-C-RNTI and transmitted. DCI format 2_1 is used to inform PRB(s) and OFDM symbol(s) that the UE may assume that transmission is not intended. The following information included in DCI format 2_1 such as preemption indication 1, preemption indication 2, . . . , preemption indication N is CRC scrambled by INT-RNTI and transmitted.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Physical Uplink Control Channel (PUCCH)

A PUCCH supports multiple formats, and the PUCCH formats may be classified based on a symbol duration, a payload size, and multiplexing. The following Table 5 represents an example of the PUCCH format.

TABLE 5

| Format | PUCCH length in OFDM symbols | Number of bits | Usage | Others |
| --- | --- | --- | --- | --- |
| 0 | 1-2 | ≤2 | 1 | Sequence selection |
| 1 | 4-14 | ≤2 | 2 | Sequence modulation |
| 2 | 1-2 | >2 | 4 | CP-OFDM |
| 3 | 4-14 | >2 | 8 | DFT-s-OFDM (no UE multiplexing) |
| 4 | 4-14 | >2 | 16 | DFT-s-OFDM (Pre DFT OCC) |

The PUCCH formats of Table 5 may be roughly divided into (1) a short PUCCH and (2) a long PUCCH.

The short-duration PUCCH may be divided into Formats 0 and 2, and a short PUCCH of 2 symbols may be constituted by repeating 1 symbol short PUCCH structure. PUCCH Format 0 may support UCI of up to 2 bits together with multiplexing. Format 0 may be used when low latency support, small-size UCI, and low PAPR are required. Format 0 may have a structure based on cyclic shift (CS) selection without a DMRS, and occupy 1 PRB or 1 to 2 symbols. Further, up to 3 UEs (in the case of 2 bits) or 6 UEs (in the case of 1 bit) per PRB may be supported. PUCCH Format 2 may support UCI of 2 bits or more without multiplexing. PUCCH Format 2 may be used for the low latency support, and medium or large-size UCI. PUCCH Format 2 may occupy 1 to 16 PRBs and 1 to 2 symbols. Further, PUCCH Format 2 may support one UE per PRB without multiplexing.

The long PUCCH may be divided into Formats 1, 3, and 4. PUCCH Format 1 may support UCI of up to 2 bits together with multiplexing. PUCCH Format 1 may be applied to coverage support, small-size UCI, and a lot of multiplexing. PUCCH Format 1 has an LTE PF1-like structure (a structure in which OCC of a time domain and a DMRS/UCI symbol cross). PUCCH Format 1 may occupy 1 PRB, and 4 to 14 symbols, and support up to 84 UEs (12 CSsx7 OCCs) per PRB. PUCCH Format 3 may support UCI of 2 bits or more without multiplexing. PUCCH Format 3 may be applied to the coverage support and the large-size UCI. PUCCH Format 3 may occupy 1 to 16 PRBs and 4 to 14 symbols. PUCCH Format 3 may support one UE per PRB without multiplexing. PUCCH Format 4 may support UCI of 2 bits or more without multiplexing. PUCCH Format 4 may be used for the coverage support and the medium-size UCI. PUCCH Format 4 has an LTE PF5-like structure (TDM of DMRS and DFTed UCI with F-domain OCC). PUCCH Format 4 may occupy 1 PRB, and 4 to 14 symbols, and support up to 2 UEs (in the case of SF=2) or up to 4 UEs (in the case of SF=4) per PRB.

The UE transmits one or two PUCCHs through a serving cell in different symbols within one slot. When two PUCCHs are transmitted in one slot, at least one of the two PUCCHs has a short PUCCH structure. That is, in one slot, (1) transmission of short PUCCH and short PUCCH is possible, (2) transmission of long PUCCH and short PUCCH is possible, but (3) transmission of long PUCCH and long PUCCH is impossible.

DL and UL Transmission/Reception Operation

DL Transmission/Reception Operation

FIG. 7 illustrates an example of a downlink transmission and reception operation.

Referring to FIG. 7, the eNB may schedule downlink transmission such as the frequency/time resource, the transport layer, an downlink precoder, the MCS, etc., (S701). Specifically, the eNB may determine a beam for PDSCH transmission to the UE. In addition, the UE may receive Downlink Control Information (DCI) for downlink scheduling (i.e., including scheduling information of the PDSCH) on the PDCCH (S702). DCI format 1_0 or DCI format 1_1 may be used for the downlink scheduling and specifically, DCI format 1_1 may include information such as the following examples: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization.

In particular, according to each state indicated in an antenna port(s) field, the number of DMRS ports may be scheduled, and single-user (SU)/Multi-user (MU) transmission scheduling is also available. In addition, the TCI field consists of 3 bits, and the QCL for the DMRS may be dynamically indicated by indicating a maximum of 8 TCI states according to the TCI field value. The UE may receive downlink data from the base station on the PDSCH (S703). When the UE detects a PDCCH including DCI format 1_0 or 1_1, the UE may decode the PDSCH according to an indication by the corresponding DCI.

Here, when the UE receives a PDSCH scheduled by DCI format 1_1, a DMRS configuration type may be configured by higher layer parameter "dmrs-Type" in the UE and the DMRS type is used for receiving the PDSCH. Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not related to PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs and the UE may assume that the same precoding is applied to the allocated resource. On the contrary, when P' is determined as any one of {2 and 4}, a Precoding Resource Block (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE may first read a 5-bit MCD field in the DCI and determine the modulation order and the target code rate. In addition, the UE may read a redundancy version field in the DCI and determine a redundancy version. In addition, the UE may determine the transport block size by using the number of layers before rate matching and the total number of allocated PRBs.

A transport block may be made up of one or more code block groups (CBG), and one CBG may be made up of one or more code blocks (CB). Also, in an NR system, data transmission and reception may be performed for each CB/CBG as well as for each transport block. Accordingly, ACK/NACK transmission and retransmission per CB/CBG also may be possible. The UE may receive information on CB/CBG from the base station through a DCI (e.g., DCI format 0_1 and DCI format 1_1). Also, the UE may receive information on a data transmission unit (e.g., TB/CB/CBG) from the base station.

UL Transmission/Reception Operation

FIG. 8 illustrates an example of an uplink transmission and reception operation.

Referring to the FIG. 8, the eNB may schedule uplink transmission such as the frequency/time resource, the transport layer, an uplink precoder, the MCS, etc., (S801). In particular, the eNB may determine a beam for PUSCH transmission of the UE through the beam management operations described above. And, the UE may receive, from the eNB, DCI for uplink scheduling (i.e., including scheduling information of the PUSCH) on the PDCCH (S802). DCI format 0_0 or 0_1 may be used for the uplink scheduling and in particular, DCI format 0_1 may include information such as the following examples: Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter "usage" may be indicated by an SRS resource indicator field. Further, "spatialRelationInfo" may be configured for each SRS resource and a value of "spatialRelationInfo" may be one of {CRI, SSB, and SRI}.

In addition, the UE may transmit the uplink data to the eNB on the PUSCH (S803). When the UE detects a PDCCH including DCI format 0_0 or 0_1, the UE may transmit the corresponding PUSCH according to the indication by the corresponding DCI. two schemes (Codebook based transmission scheme and non-codebook based transmission scheme) are supported for PUSCH transmission.

In the case of the codebook based transmission, when higher layer parameter txConfig" is set to "codebook", the UE is configured to the codebook based transmission. On the contrary, when higher layer parameter txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 0_0, the PUSCH transmission is based on a single antenna port. In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "nonCodebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Quasi-Co Location (QCL)

The antenna port is defined so that a channel over which a symbol on an antenna port is conveyed may be inferred from a channel over which another symbol on the same antenna port is conveyed. When properties of a channel over which a symbol on one antenna port is conveyed may be inferred from a channel over which a symbol on another antenna port is conveyed, the two antenna ports may be considered as being in a quasi co-located or quasi co-location (QC/QCL) relationship.

The channel properties include one or more of delay spread, Doppler spread, frequency/Doppler shift, average received power, received timing/average delay, and spatial RX parameter. The spatial Rx parameter means a spatial (reception) channel property parameter such as an angle of arrival.

The UE may be configured with a list of up to M TCI-State configurations within the higher layer parameter PDSCH-Config to decode PDSCH according to a detected PDCCH with DCI intended for the corresponding UE and a given serving cell, where M depends on UE capability.

Each TCI-State contains parameters for configuring a quasi co-location relationship between one or two DL reference signals and the DM-RS ports of the PDSCH.

The quasi co-location relationship is configured by the higher layer parameter qcl-Type1 for the first DL RS and qcl-Type2 for the second DL RS (if configured). For the case of two DL RSs, the QCL types are not be the same, regardless of whether the references are to the same DL RS or different DL RSs.

The quasi co-location types corresponding to each DL RS are given by the higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is a specific NZP CSI-RS, the corresponding NZP CSI-RS antenna ports may be indicated/configured to be QCLed with a specific TRS in terms of QCL-TypeA and with a specific SSB in terms of QCL-TypeD. The UE receiving the indication/configuration may receive the corresponding NZP CSI-RS using the Doppler or delay value measured in the QCL-TypeA TRS and apply the Rx beam used for QCL-TypeD SSB reception to the reception of the corresponding NZP CSI-RS reception.

The UE may receive an activation command by MAC CE signaling used to map up to eight TCI states to the codepoint of the DCI field 'Transmission Configuration Indication'.

In relation to the beam indication, the UE may be RRC-configured with a list for up to M candidate Transmission Configuration Indication (TCI) states for the purpose of at least Quasi Co-location (QCL) indication, where M may be 64.

Each TCI state may be configured in one RS set. IDs of each DL RS for the purpose of spatial QCL (QCL Type D) at least in the RS set may refer to one of DL RS types such as SSB, P-CSI RS, SP-CSI RS, and A-CSI RS. Initialization/update for the ID of DL RS(s) in the RS set that are used at least for the purpose of spatial QCL may be performed at least by explicit signaling.

The TCI-State IE associates one or two DL reference signals (RS) with a corresponding quasi co-location (QCL) type. The TCI-State IE may include parameters such as bwp-Id/reference signal/QCL type.

A bwp-Id parameter indicates DL BWP where RS is positioned, a cell parameter indicates a carrier where RS is positioned, a reference signal parameter indicates a reference antenna port(s) that is a source of quasi co-location for a corresponding target antenna port(s), or a reference signal including it. The target antenna port(s) may be CSI-RS, PDCCH DMRS, or PDSCH DMRS. For example, a corresponding TCI state ID may be indicated to NZP CSI-RS resource configuration information to indicate QCL reference RS information for NZP CSI-RS. As another example, a TCI state ID may be indicated in each CORESET configuration to indicate QCL reference information for the PDCCH DMRS antenna port(s). As another example, a TCI state ID may be indicated through DCI to indicate QCL reference information for the PDSCH DMRS antenna port(s).

The descriptions (e.g., 3GPP system, frame structure, DL and UL transmission and reception, etc.) given above may be applied/used in combination with methods and/or embodiments proposed in the present disclosure or may be supplemented to clarify technical features of the methods proposed in the present disclosure. In the present disclosure, the presence of a slash "/" may indicate that all or only some of words or phrases separated by/are included.

Hybrid Automatic Repeat and reQuest (HARQ)

In relation to a UE operation for reporting control information, a HARQ-ACK operation is described. HARQ in NR may have the following features.

1) 1-bit HARQ-ACK feedback may be supported per transport block (TB). Here, an operation of one DL HARQ process is supported for some UEs, whereas operations of one or more DL HARQ processes are supported for a given UE.

2) A UE may support a set of minimum HARQ processing times. Here, the minimum HARQ processing time means a minimum time required for the UE ranging from DL data from reception from a base station to corresponding HARQ-ACK transmission timing. In relation this, two UE processing times N1 and K1 may be defined depending on (1) symbol granularity and (2) slot granularity. First, from a UE perspective, N1 denotes the number of OFDM symbols required for UE processing from the last of PDSCH reception to the fastest start of corresponding HARQ-ACK transmission. The N1 may be defined as in the following Tables 6 and 7 depending on OFDM numerology (i.e., subcarrier spacing) and a DMRS pattern.

TABLE 6

| Configuration | HARQ Timing Parameter | Units | 15 KHz SCS | 30 KHz SCS | 60 KHz SCS | 120 KHz SCS |
| --- | --- | --- | --- | --- | --- | --- |
| Front-loaded DMRS only | N1 | Symbols | 8 | 10 | 17 | 20 |
| Front-loaded DMRS only + additional DMRS | N1 | Symbols | 13 | 13 | 20 | 24 |

TABLE 7

| Configuration | HARQ Timing Parameter | Units | 15 KHz SCS | 30 KHz SCS | 60 KHz SCS |
| --- | --- | --- | --- | --- | --- |
| Front-loaded DMRS only | N1 | Symbols | 3 | 4.5 | 9(FR1) |
| Front-loaded DMRS only + additional DMRS | N1 | Symbols | [13] | [13] | [20] |

Further, K1 may denote the number of slots from a slot of a PDSCH to a slot of corresponding HARQ-ACK transmission. FIG. 9 illustrates an example of HARQ-ACK timing K1. In FIG. 9, K0 denotes the number of slots from a slot with DL grant PDCCH to a slot with corresponding PDSCH transmission, and K2 denotes the number of slots from a slot with UL grant PDCCH to a slot with corresponding PUSCH transmission. That is, K0, K1, and K2 may be arranged briefly as in Table 8 below.

TABLE 8

| | A | B |
|---|---|---|
| K0 | DL scheduling DCI | Corresponding DL data transmission |
| K1 | DL data reception | Corresponding HARQ-ACK |
| K2 | UL scheduling DCI | Corresponding UL data transmission |

Slot timing between A and B is indicated by a field of DCI from a set of the values. Further, NR supports a different minimum HARQ processing time between UEs. The HARQ processing time includes a delay between DL data reception timing and corresponding HARQ-ACK transmission timing and a delay between UL grant reception timing and corresponding UL data transmission timing. A UE transmits a capability of its minimum HARQ processing time to a base station. An asynchronous and adaptive DL HARQ is supported in at least enhanced Mobile Broadband (eMBB) and ultra-reliable low latency (URLLC).

From a UE perspective, in a time domain, HARQ ACK/NACK feedback for multiple DL transmissions may be transmitted in one UL data/control region. Timing between DL data reception and corresponding positive acknowledgement is indicated by a field within DCI from a set of values, and the set of values is configured by higher layer. The timing is defined for a case where at least the timing is not known to the UE.

Multiple Transmission and Reception Point (TRP)-Related Operation

The coordinated multi point (CoMP) technique is a scheme in a plurality of base stations exchange (e.g., use X2 interface) or utilize channel information (e.g., RI/CQI/PMI/LI, etc.) fed back from the user equipment (UE) to perform cooperative transmission with the UE, thereby effectively controlling interference. According to the scheme used, the cooperative transmission may be divided into joint transmission (JT), coordinated scheduling (CS), coordinated beamforming (CB), dynamic point selection (DPS), dynamic point blacking (DPB), and the like.

Non-coherent joint transmission (NCJT) may refer to cooperative transmission that does not consider interference (that is, with no interference). For example, the NCJT may be a scheme in which a base station(s) transmits data to one UE through multiple TRPs by using the same time resource and frequency resource. In this scheme, the multiple TRPs of the base station(s) may be configured to transmit data to UE through different layers by using different demodulation reference signal (DMRS) ports. In other words, the NCJT may correspond to a transmission scheme in which transmission of a MIMO layer(s) from two or more TRPs is performed without adaptive precoding between the TRPs.

The NCJT may be categorized into fully overlapped NCJT, in which time and frequency resources used for transmission by each base station (or TRP) are fully overlapped, and partially overlapped NCJT, in which time and frequency resources used for transmission by each base station (or TRP) are partially overlapped. This is only for convenience of explanation in the present disclosure, and it is needless to say that, in the embodiments and methods to be described below, the above-mentioned terms can be replaced with other terms with the same technical meanings. For example, in the case of partially overlapped NCJT, both data of a first base station (e.g., TRP 1) and data of a second base station (e.g., TRP 2) may be transmitted in some of the time resources and/or frequency resources, and data of only one of the first and second base stations may be transmitted in the remaining time resources and/or frequency resources.

TRP transmits data scheduling information to an NCJT receiving UE as DCI (Downlink Control Information). From the perspective of downlink control information (DCI) transmission, M-TRP (multiple TRP) transmission may be divided into i) M-DCI (multiple DCI) based M-TRP transmission in which each TRP transmits a different DCI and ii) S-DCI (single DCI) based M-TRP transmission in which one TRP transmits DCI.

Firstly, the single DCI based MTRP scheme will be described. In the single DCI based MTRP scheme in which a representative TRP transmits scheduling information for data transmitted by itself and data transmitted by another TRP through one DCI, MTRPs cooperatively transmit one common PDSCH and each TRP participating in the cooperative transmission spatially divides the corresponding PDSCH into different layers (i.e., different DMRS ports). In other words, MTRPs transmit one PDSCH but each TRP transmits only some of multiple layers of the PDSCH. For example, when 4-layer data is transmitted, TRP 1 transmits 2 layers, and TRP 2 transmits the remaining 2 layers to the UE.

In this case, scheduling information for the PDSCH is indicated to the UE through one DCI, and the corresponding DCI indicates which DMRS port uses information of which QCL RS and QCL type (which is different from conventionally indicating the QCL RS and TYPE that are commonly applied to all DMRS ports indicated by the DCI). That is, M TCI states (M=2 for 2 TRP cooperative transmission) are indicated through the TCI field in the DCI, and the QCL RS and type are identified by using M TCI states which are different for M DMRS port groups. Also, DMRS port information may be indicated by using a new DMRS table.

As an example, in the case of the S-DCI, since all scheduling information for data transmitted by M TRPs should be delivered through one DCI, the S-DCI may be used in an ideal backhaul (BH) environment in which two TRPs may be dynamically coordinated with each other.

Secondly, the multiple DCI based MTRP method will be described. MTRPs transmit different DCIs and PDSCHs, respectively (the UE receives N DCIs and N PDSCHs from N TRPs), and the corresponding PDSCHs are transmitted by (partially or wholly) overlapping on different time resources. The corresponding PDSCHs are transmitted through different scrambling IDs, and the corresponding DCIs may be transmitted through Coresets belonging to different Coreset groups (A coreset group may be identified as an index defined in the coreset configuration of each Coreset. For example, if Coresets 1 and 2 are set to index=0 and Coresets 3 and 4 are set to index=1, Coresets 1 and 2 belong to Coreset group 0 and Coresets 3 and 4 belong to Coreset group 1. If no index is defined for a coreset, this may be interpreted as index=0). If multiple scrambling IDs are set in one serving cell or two or more coreset groups are set, the UE may know that data is received by multiple DCI-based MTRP operation.

For example, the single DCI based MTRP scheme or the multiple DCI based MTRP scheme may be indicated to the UE via separate signaling. As an example, when a plurality of CRS patterns are indicated to the UE for MTRP operation for one serving cell, PDSCH rate matching for CRS may be different depending on this MTRP operation is a single DCI based MTRP operation or a multiple DCI based MTRP operation.

The base station described in this disclosure may be a generic term for an object that transmits/receives data to and from UE. For example, the base station described herein may be a concept including one or more transmission points (TPs), one or more transmission and reception points (TRPs), and the like. For example, multiple TPs and/or multiple TRPs described herein may be included in one base station or included in multiple base stations. In addition, the TP and/or TRP may include a panel of a base station, a transmission and reception unit, and the like.

In addition, the TRP described in this disclosure means an antenna array having one or more antenna elements available in a network located at a specific geographical location in a specific area. Although this disclosure is described with respect to "TRP" for convenience of explanation, the TRP may be replaced with a base station, a transmission point (TP), a cell (e.g., a macro cell/small cell/pico cell, etc.), an antenna array, or a panel and understood and applied as such.

In addition, the CORESET group ID described in this disclosure may refer to an index/identification information (e.g., ID)/indicator, etc. for distinguishing a CORESET configured for/associated with each TRP/panel (or for each TRP/panel). In addition, the CORESET group may be a group/union of CORESETs which is distinguished by the index/identification information (e.g., ID) for distinguishing the CORESET and the CORESET group ID. For example, the CORESET group ID may be specific index information defined in the CORESET configuration. For example, the CORESET group may be configured/indicated/defined by an index defined in the CORESET configuration for each CORESET. The CORESET group ID may be configured/indicated via higher layer signaling (e.g., RRC signaling)/L2 signaling (e.g., MAC-CE)/L1 signaling (e.g., DCI).

For example, ControlResourceSet information element (IE) that is a higher layer parameter is used to configure a time/frequency control resource set (CORESET). For example, the control resource set may be related to detection and reception of downlink control information. Examples of the ControlResourceSet IE may include CORESET related ID (e.g., controlResourceSetID), an index of a CORESET pool for CORESET (e.g., CORESETPoolIndex), time/frequency resource configuration of CORESET, and TCI information related to CORESET. For example, the index of the CORESET pool (e.g., CORESETPoolIndex) may be set to 0 or 1.

For example, it may be indicated/configured so that PDCCH detection for each TRP/panel is performed on a per CORESET group basis. And/or, it may be indicated/configured so that uplink control information (e.g., CSI, HARQ-A/N, SR) and/or uplink physical channel resources (e.g., PUCCH/PRACH/SRS resources) for each TRP/panel are divided on a per CORESET group basis and managed/controlled. And/or, HARQ A/N (process/retransmission) for PDSCH/PUSCH, etc., scheduled for each TRP/panel may be managed on a per CORESET group basis.

In addition, the UE may recognize the PUSCH (or PUCCH) scheduled by the DCI received through different CORESETs (or CORESETs belonging to different CORESET groups) as the PUSCH (or PUCCH) transmitted to different TRPs, or the PUSCHs (or PUCCHs) of different TRPs. In addition, the scheme for UL transmission (e.g., PUSCH/PUCCH) transmitted to different TRPs may be equally applied to UL transmission (e.g., PUSCH/PUCCH) transmitted to different panels belonging to the same TRP.

M-TRP Transmission Scheme

M-TRP transmission by which multiple (e.g., M) TRPs transmit data to one user equipment (UE) may be divided into two main types of transmission: eMBB M-TRP transmission (or M-TRP eMMB) which is a scheme for increasing a transmission rate and URLLC M-TRP transmission (or M-TRP URLLC) which is a scheme for increasing a reception success rate and reducing latency.

URLLC M-TRP may mean that M-TRPs transmit the same TB (Transport Block) using different resources (e.g., layers/time resources/frequency resources, etc.). A number of TCI state(s) may be indicated by DCI to a UE configured with the URLLC M-TRP transmission scheme, and data received using the QCL reference signal (RS) of each TCI state may be assumed to be the same TB. On the other hand, eMBB M-TRP may mean that M-TRPs transmit different TBs using different resources (e.g., layers/time resources/frequency resources, etc.). A number of TCI state(s) may be indicated by DCI to a UE configured with the eMBB M-TRP transmission scheme, and data received using the QCL RS of each TCI state may be assumed to be different TBs. In relation to at least eMBB M-TRP, each TCI code point within DCI may correspond to 1 or 2 TCI states. If 2 TCI states are activated within one TCI code point, each TCI state for at least DMRS type 1 may correspond to one CDM group.

For example, the UE may decide/determine whether the corresponding M-TRP transmission is URLLC transmission or eMBB transmission since it uses the RNTI configured for MTRP-URLLC and the RNTI configured for MTRP-eMBB, separately. That is, if the CRC masking of the DCI received by the UE is performed using the RNTI configured for the MTRP-URLLC purpose, this may correspond to URLLC transmission, and if the CRC masking of the DCI is performed using the RNTI configured for the MTRP-eMBB purpose, this may correspond to eMBB transmission.

Table 9 shows various schemes that can be considered for URLLC M-TRP transmission. Referring to Table 9, there exist various schemes such as SDM/FDM/TDM.

TABLE 9

To facilitate further down-selection for one or more schemes in RAN1#96bis, schemes for multi-TRP based URLLC, scheduled by single DCI at least, are clarified as following:
- Scheme 1 (SDM): n (n<=$N_s$) TCI states within the single slot, with overlapped time and frequency resource allocation
- Scheme 1a:
    - Each transmission occasion is a layer or a set of layers of the same TB, with each layer or layer set is associated with one TCI and one set of DMRS port(s).
    - Single codeword with one RV is used across all spatial layers or layer sets. From the UE perspective, different coded bits are mapped to different layers or layer sets with the same mapping rule as in Rel-15.

TABLE 9-continued

- Scheme 1b:
  - Each transmission occasion is a layer or a set of layers of the same TB, with each layer or layer set is associated with one TCI and one set of DMRS port(s).
  - Single codeword with one RV is used for each spatial layer or layer set. The RVs corresponding to each spatial layer or layer set can be the same or different.
- Scheme 1c:
  - One transmission occasion is one layer of the same TB with one DMRS port associated with multiple TCI state indices, or one layer of the same TB with multiple DMRS ports associated with multiple TCI state indices one by one.
- For Scheme 1a and 1c, the same MCS is applied for all layers or layer sets.
- For scheme 1b, same or different MCS/modulation orders for different layers or layer sets can be discussed.
  - Scheme 2 (FDM): n (n<=$N_f$) TCI states within the single slot, with non-overlapped frequency resource allocation
- Each non-overlapped frequency resource allocation is associated with one TCI state.
- Same single/multiple DMRS port(s) are associated with all non-overlapped frequency resource allocations.
- Scheme 2a:
  - Single codeword with one RV is used across full resource allocation. From UE perspective, the common RB mapping (codeword to layer mapping) is applied across full resource allocation.
- Scheme 2b:
  - Single codeword with one RV is used for each non-overlapped frequency resource allocation. The RVs corresponding to each non-overlapped frequency resource allocation can be the same or different.
- For scheme 2a, same MCS is applied for all non-overlapped frequency resource allocations
- For scheme 2b, same or different MCS/modulation orders for different non-overlapped frequency resource allocations can be discussed.
- Details of frequency resource allocatin mechanism for FDM 2a/2b with regarding to allocation granularity, time domain allocation can be discussed.
- Scheme 3 (TDM): n (n<=$N_{t1}$) TCI states within the single slot, with non-overlapped time resource allocation
  - Each transmission occasion of the TB has one TCI and one RV with the time granularity of mini-slot.
  - All transmission occasion (s) within the slot use a common MCS with same single or multiple DMRS port(s).
  - RV/TCI state can be same or different among transmission occasions.
  - PPS channel estimation interpolation across mini-slots with the same TCI index
- Scheme 4 (TDM): n (n<=$N_{t2}$) TCI states with K (n<=K) different slots.
  - Each transmission occasion of the TB has one TCI and one RV.
  - All transmission occasion (s) across K slots use a common MCS with same single or multiple DMRS port(s)
  - RV/TCI state can be same or different among transmission occasions.
  - PPS channel estimation interpolation across slots with the same TCI index Note that M-TRP/panel based URLLC schemes shall be compared in terms of improved reliability, efficiency, and specification impact.
Note:
Support of number of layers per TRP may be discussed For example, in TDM based URLLC, scheme 3/4 of Table 9 is under discussion for standardization. Specifically, scheme 4 means a scheme in which one TRP transmits a TB in one slot, and has the effect of increasing the data reception probability through the same TB received from several TRPs in several slots. On the other hand, scheme 3 means a scheme in which one TRP transmits a TB through several consecutive OFDM symbols (i.e., a symbol group), and may be configured so that several TRPs in one slot transmit the same TB through different symbol groups.

Method for Improving Reliability in Multi-TRPs

FIG. 10 illustrates an example of a transmission/reception method for improving reliability supported by a plurality of TRPs, and the following two methods may be considered.

The example in (a) of FIG. 10 shows that a layer group transmitting the same codeword (CW)/transport block (TB) correspond to different TRPs. That is, the same CW may be transmitted through different layers/layer groups. In this case, a layer group may refer to some kind of layer set made up of one or more layers. As such, the amount of transmission resources increases as the number of layers increases, and this is advantageous in that robust channel coding with a low code rate can be used for TB. In addition, it is expected that the reliability of received signals may be improved based on diversity gain due to different channels from a plurality of TRPs.

Meanwhile, the example in (b) of FIG. 10 shows an example in which different CWs are transmitted through layer groups corresponding to different TRPs. That is, different CWs may be transmitted through different layers/layer groups. In this case, it may be assumed that TBs corresponding to the first CW (CW #1) and the second CW (CW #2) are the same. Therefore, this can be seen as an example of repeated transmission of the same TB. In the case of (b) of FIG. 10, the code rate corresponding to the TB may be higher than that of (a) of FIG. 10. Still, there is an advantage that a code rate can be adjusted by indicating different redundancy version (RV) values for encoding bits generated from the same TB according to a channel environment, or that a modulation order of each CW may be adjusted.

In (a) of FIG. 10 or (b) of FIG. 10, the same TB is repeatedly transmitted through different layer groups, and each layer group is transmitted by different TRPs/panels, thereby increasing the data reception probability, which may be called spatial division multiplexing (SDM)-based URLLC M-TRP transmission. A layer(s) belonging to different layer groups are transmitted through DMRS ports belonging to different DMRS CDM groups, respectively.

In addition, although the above description regarding multiple TRPs has been given with respect to a spatial division multiplexing (SDM) scheme using different layers, it also may be extensively applied to a frequency division multiplexing (FDM) scheme based on different frequency domain resources (e.g., RB/PRB (set)), and/or a time division multiplexing (TDM) scheme based on different time domain resources (e.g., slots, symbols, and sub-symbols).

Hereinafter, in the present disclosure, methods that can be proposed in consideration of cooperative transmission (e.g., NCJT) between multiple base stations (e.g., multiple TPs/TRPs of one or more base stations) and UE will be described. Specifically, Proposal 1 proposes a method of dividing/recognizing a TRP and a UCI related to each TRP based on the CORESET/CORESET group in transmitting the UCI for the M-TRP. Proposal 2 defines a PUCCH group and proposes a method of dividing TRPs based on the PUCCH group and a method of determining PUCCH resources when transmitting UCI for multiple TRPs based on the PUCCH group. Proposal 3 proposes a multiplexing/drop method when overlapping/collision of uplink channel (for example, PUCCH/PUCCH) resources for each TRP occurs in multiple DCI-based MTRP transmissions. Proposal 4 proposes a method of configuring a HARQ-ACK codebook for multiple TRPs. Proposal 5 proposes a method of detecting DCI scheduling MTRP transmission. Proposal 6 proposes a method of setting a timing parameter K1 related to HARQ-ACK report. Proposal 7 defines a PUCCH group for spatial relation application and proposes a method of updating spatial relation information for the PUCCH group.

As described above, each TRP may be divided based on an index (for example, CORESETPoolIndex) (or CORESET group ID) of a CORESET pool configured in CORESET. The methods described in the present disclosure are described based on one or more TP/TRPs of the base station(s), but the methods may also be applied to transmission based on one or more panels of the base station(s) in the same or similar scheme. Therefore, descriptions based on multiple TRPs in the present disclosure may be equally applied to transmission through a plurality of panels.

In addition, all CORESETs described in proposals 1 to 7 to be described below may be described for CORESETs set in the same active BWP.

In the current NR, up to 128 physical uplink control channel (PUCCH) resources may be configured for one serving cell, and up to 4 PUCCH resource sets may be configured for the UE. The PUCCH resource set may be configured based on a higher layer parameter, PUCCH-ResourceSet, and may be divided into each index (for example, pucch-ResourceSetId). The maximum number of PUCCH resources of the first PUCCH resource set (i.e., PUCCH resource set 0 with pucch-ResourceSetId=0) is 32, and the maximum number of PUCCH resources of the maximum number of remaining PUCCH resource sets (i.e., PUCCH resource sets 1, 2, and 3) is eight. In the following description, PUCCH resource sets 0, 1, 2, and 3 may refer to PUCCH resource sets in which pucch-ResourceSetId corresponds to 0, 1, 2, and 3, respectively. In addition, for convenience of description in the present disclosure, the PUCCH resource sets 0, 1, 2, and 3 may be expressed as set 0, 1, 2, and 3.

The user equipment (UE) may report uplink control information (UCI) to the base station. The UCI may include HARQ-ACK information (or ACK/NACK), a schedule request (SR), CSI, a link recovery request (LRR), and the like. The UCI may be transmitted through an uplink channel (for example, PUCCH/PUSCH). In the following description, the HARQ-ACK information may be expressed as ACK/NACK or A/N.

When the UCI is transmitted through PUCCH, PUCCH resources for schedual request (SR) and periodic (P)/semi-persistent (SP) CSI report may be configured through RRC signaling. The PUCCH resources for ACK/NACK (hereinafter, A/N) report for PDSCH and A/N report for DCI releasing semi-persistent scheduling (SPS) PDSCH may exist in set 0, 1, 2, and 3. As described above, a maximum of 32 PUCCH resources in set 0 and a maximum of 8 PUCCH resources in each of set 1, set 2, and set 3 may be configured through the RRC signaling. The final PUCCH resource selection for A/N transmission is indicated through a (PUCCH resource indicator) (PRI) field included in the DCI, and one PUCCH resource existing in one set of a plurality of PUCCH resource sets (for example, sets 0, 1, 2, and 3) is selected.

In the case of a large backhaul delay between two TRPs (for example, TRP 1 and TRP 2) participating in cooperation in a multiple DCI-based M-TRP (multiple TRP) transmission scheme, it is preferable that the UE divides the UCI (for example, SR, CSI, A/N) of each TRP and transmits the divided UCI to different PUCCHs, respectively. When the UE transmits the UCI of the two TRPs as one PUCCH as a representative TRP (for example, TRP 1), this is because an additional delay required for the UCI to be transmitted to another TRP (for example, TRP2) through the backhaul occurs.

When OFDM symbols of PUCCH resources for transmitting UCI of the same TRP overlap (e.g., OFDM symbol for HARQ-ACK information for TRR 1 and OFDM symbol for CSI overlap), multiplexing may be performed using the existing Rel-15 UCI transmission method as it is, or one PUCCH may be transmitted and the remaining PUCCHs may be dropped. However, when the OFDM symbols of the PUCCH resources for transmitting the UCI of different TRPs overlap, a problem may occur when the UCI transmission method of Rel-15 is followed. This is because the existing scheme was designed without considering the M-TRP operation. Therefore, it is necessary to consider a method of determining a resource for UCI transmission and transmitting the UCI in a method different from the conventional Rel-15 UCI transmission method.

<Proposal 1>

In Proposal 1 of the present disclosure, in transmitting UCI (for example, A/N, SR, CSI, etc.) for M-TRP, based on CORESET/CORESET group, a method of distinguishing/recognizing TRP and UCI related to each TRP based on CORESET/CORESET group will be described.

As described above, the CORESET group includes one or more CORESETs, and may be distinguished based on the CORESET group ID (for example, CORESETPoolIndex). In addition, each CORESET corresponding to different CORESET group IDs may be related to different TRPs.

Embodiment 1-1

The UE may feed back HARQ-ACK information for downlink data (for example, PDSCH, etc.) transmitted by the base station. For example, when the UE successfully decodes the transport block (TB) transmitted by the base station, the UE may feed back ACK, and when the decoding fails (including the case where it is not received), the UE may feed back NACK. The UE may feed back HARQ-ACK information even for M-TRP for cooperative transmission. The UE may recognize whether it is S-TRP transmission or M-TRP transmission based on CORESET/CORESET group related to DCI including HARQ-ACK (i.e., A/N) related indication information.

In the case of A/N PUCCH transmission for M-TRP (for example, TRP 1 and TRP 2), the UE may distinguish A/N of TRP 1 and A/N of TRP 2 as follows. When the CORESET group of the DCI (or the DCI scheduling the PDSCH target of A/N) scheduling the A/N transmission belongs to the same CORESET group, the A/N is interpreted as an A/N of the same TRP, and when the CORESET group is different, the corresponding A/N may be interpreted as an A/N of another TRP. In other words, the DCI may be received through the PDCCH, and whether the TRP is the same may be determined depending on whether the CORESET group including the CORESET in which the PDCCH is received is the same or different. For example, when the CORESET-PoolIndex related to the CORESET from which the PDCCH is received is the same, it may be interpreted as the same TRP, and when the CORESETPoolIndex is different, it may be interpreted as different TRPs.

For example, when the DCI scheduling the A/N is transmitted to CORESET group 1 (i.e., when transmitted from CORESET corresponding to CORESET group 1), it is identified as A/N of TRP 1, and when the DCI scheduling the A/N is transmitted to CORESET group 2 (i.e., when transmitted from CORESET corresponding to CORESET group 2), it is identified as A/N of TRP 2. The UE may select the PUCCH resource indicated through the PUCCH resource indicator (PRI) of the DCI (i.e., DCI received from CORESET group 1) transmitted by TRP 1 to transmit the A/N of TRP 1, and select the PUCCH resource indicated through the PRI of the DCI (i.e., DCI received from CORESET group 2) transmitted by TRP 2 to transmit the A/N of TRP 2. In the above example, the CORESET group 1 may include CORESET in which CORESETPoolIndex is set to 0, and the CORESET group 2 may include CORESET in which CORESETPoolIndex is set to 1.

Embodiment 1-2) In the case of semi-persistent (SP) CSI report for M-TRP, SP-CSI configuration and PUCCH resources are configured through RRC signaling, and activation/release of SP-CSI report is configured via the MAC CE signal. According to which CORESET (and/or CORESET group) the DCI scheduling the PDSCH including the activation MAC CE information is transmitted through, the TRP that is the target of the SP-CSI report may be identified.

For example, when the DCI scheduling the PDSCH (i.e., PDSCH including activation MAC CE information) is transmitted through CORESET belonging to CORESET group 1, the UE may recognize that it is SP-CSI of TRP 1 (the UE may transmit SP-CSI to the TRP 1). In addition, when the DCI scheduling the PDSCH (i.e., PDSCH including activation MAC CE information) is transmitted through CORESET belonging to CORESET group 2, the UE may recognize that it is SP-CSI of TRP 2 (the UE may transmit SP-CSI to the TRP 2).

Embodiment 1-3) In case of scheduling request (SR)/periodic CSI (P-CSI) for M-TRP, configuration of SR and/or periodic CSI (P-CSI) and PUCCH resources are configured through RRC signaling. Therefore, according to which CORESET (and/or CORESET group) the DCI scheduling the PDSCH including the RRC configuration information is transmitted through, the TRP that is the target of the SR/P-CSI may be identified. For example, when the DCI scheduling the PDSCH is transmitted through the CORESET belonging to the CORESET group 1, the UE may recognize that it is the SR and P-CSI of TRP 1, and when the DCI scheduling the PDSCH is transmitted through the CORESET belonging to the CORESET group 2, the UE may recognize that it is SR and the P-CSI of TRP 2. (For example, the SP-CSI may also identify the target TRP in the same manner as in embodiment 1-3.)

In Embodiment 1-3, an example in which each TRP transmits RRC configuration information has been described, but in reality, the RRC configuration information may be indicated by one of the two TRPs (e.g., TRP 1) irrespective of the TRP that is the target of the UCI. For example, all of these RRC settings may be delivered to the UE through a PDSCH scheduled by the DCI transmitted through the CORESET of CORESET group 1. As a result, the UE may not be able to determine which TRP the corresponding SR and P-CSI are for through CORESET as in the method described in Embodiments 1-3 above.

Considering this case, in the case of the SP/P-CSI and SR, respectively, in the CSI report setting (for example, CSI-ReportConfig) and SR resource setting (for example, SchedulingRequestResourceConfig), the SP/P-CSI and SR may directly indicate which TRP the UCI is For example, CSI report setting (for example, CSI-ReportConfig), SR resource configuration (for example, SchedulingRequestResourceConfig) each may include TRP identification information (for example, TRP ID/CORESET group ID (for example, CORESETPoolIndex))).

In the above-described embodiment 1-1/1-2/1-3, a method of identifying a TRP which is the target of a UCI report based on a CORESET/CORESET group has been described. The methods of the above embodiments are completely applicable to some UCIs (for example, A/N, SP-CSI), but there are circumstances in which they are not applicable to the remaining UCIs (for example, P-CSI, SR). In addition, implementation may be complicated when a method of identifying a TRP that is a target of UCI is different depending on the type/content/type of UCI. In consideration of the above problems, a method applicable to all environments will be described in Proposal 2.

<Proposal 2>

Proposal 2 of the present disclosure defines a PUCCH group, and describes a method of dividing TRP based on a PUCCH group. In addition, a method of determining a PUCCH resource when transmitting UCI for multiple TRPs based on a PUCCH group will be described. Referring to the Rel-15 NR standard, a PUCCH-related configuration (for example, PUCCH-Config) includes a PUCCH resource set (for example, PUCCH-ResourceSet) information and a PUCCH resource (for example, PUCCH-Resource) information.

The base station may define a PUCCH group (i.e., PUCCH resource group) and indicate to which PUCCH group the PUCCH resource configured to the UE belongs. All the PUCCH resources for UCI transmission, such as A/N, CSI, and SR belong to a specific PUCCH group, and the number of PUCCH groups equal to the number of TRPs participating in cooperation (for example, NCJT) may be set. When the TRP target of the UCI is TRP i, it is assumed that the PUCCH resource of the UCI for the TRP i belongs to PUCCH group i. The TRP may be divided based on the CORESET group index. For example, when two TRPs perform cooperative transmission, the UE reports the UCI of TRP 1 using the PUCCH resource belonging to PUCCH group 1, and reports the UCI of TRP 2 using the PUCCH resource belonging to PUCCH group 2.

Even if the PUCCH group is not explicitly signaled, the UE may group PUCCH resources, and when the PUCCH group is different, the UE operation suggested in the present disclosure may be applied as it is. In addition, the UE operation according to the PUCCH group may be applied as it is in UCI piggyback on the PUSCH.

In the case of the CSI and SR, since the PUCCH resource reporting UCI is set as RRC signaling, the UE may recognize that the PUCCH resource of the CSI and SR is CSI or SR of TRP i when the PUCCH resource of CSI and SR belongs to PUCCH group i. (In the case of the PUCCH group i and TRP i, they may not have exactly the same index, and the relationship between the PUCCH group and TRP may be set separately. Alternatively, the relationship between the PUCCH group and TRP is implicitly set as index (e.g., i). For example, the mapping relationship between the PUCCH group and the TRP is predefined, and one of the predefined mapping relationships may be indicated as an index)

In the case of the A/N, the PUCCH resource is selected from the PUCCH resource sets through the PRI defined in the DCI. Accordingly, when the CORESET that has received the DCI including the PRI belongs to CORESET group i, the PUCCH resource sets are composed of the PUCCH resources belonging to the PUCCH group i. For example, when the DCI is received through the CORESET included in the CORESET group 1, the PUCCH resource set 0 is composed of up to 32 PUCCH resources belonging to the PUCCH group 1, and when the DCI is received through the CORESET of the CORESET group 2, the PUCCH Resource set 0 is composed of up to 32 PUCCH resources belonging to the PUCCH group 2.

In the above-described proposal 2, a method of dividing and recognizing TRPs based on the PUCCH group and determining the PUCCH resources when transmitting UCI for multiple TRPs has been described. Hereinafter, a method of defining a PUCCH group will be described in detail.

Method 2-1)

The base station may configure the PUCCH group (i.e., PUCCH resource group) to the UE in the following form (for example, Example 1/Example 2) through RRC signaling (for example, PUCCH config).

Example 1) PUCCH Group Configuration Method 1

PUCCH group 0: Set 0,1,2,3, others
PUCCH group 1: Set 0,1,2,3, others

Example 1 shows an example of configuring a PUCCH group and configuring sets 0, 1, 2, and 3 and others in each PUCCH group. As described above, sets 0, 1, 2, and 3 represent a PUCCH resource set, and are composed of PUCCH resources that may be indicated by PRI. Others are composed of PUCCH resources used for SR or P/SP CSI report.

For example, a new RRC parameter may be configured to configure the PUCCH group of Example 1. A PUCCH resource set related to each PUCCH group may be configured/indicated through a parameter for configuring the PUCCH group.

Example 2) PUCCH Group Configuration Scheme 2

Set 0: PUCCH group 0, 1
Set 1: PUCCH group 0, 1
Set 2: PUCCH group 0, 1
Set 3: PUCCH group 0, 1
Others: PUCCH group 0, 1

Example 2 shows an example of configuring PUCCH groups 0 and 1 in each PUCCH resource set and others. For example, the PUCCH groups 0 and 1 may be composed of a PUCCH resource used for UCI transmission of TRP 1 and a PUCCH resource used for UCI transmission of TRP 2, respectively. PUCCH group 0,1 in the others may also be configured with PUCCH resources used for SR or P/SP CSI report toward TRP 1/2.

For example, in order to configure the PUCCH group of Example 2, a parameter for indicating the PUCCH group may be added to the PUCCH resource set parameter.

Method 2-2)

As another method for the base station to configure the PUCCH group in the UE, a method of using spatial relation information related parameters (for example, PUCCH-spatialRelationInfo) connected to a PUCCH resource may be considered. PUCCH-spatialRelationInfo is a parameter used to set parameters for spatial setting and PUCCH power control for PUCCH transmission. The PUCCH group may be set by using closedLoopindex included in PUCCH-spatialRelationInfo. closedLoopindex may be set to i0 or i1. For example, when the closedLoopindex value of the spatial relationship information connected to the PUCCH resource is 0 (i.e., i0), it belongs to PUCCH group 0, and when it is 1 (i.e., i0), it may be determined to belong to PUCCH group 1. That is, the ClosedLoopindex and the index/ID of the PUCCH group may correspond.

The PUCCH group configured according to the above-described method 2-1/2-2 may be i) used for PUCCH grouping for each TRP, ii) used to update spatial relationship information of PUCCH resources at once, and/or iii) used for PUCCH grouping that may be transmitted per UE panel.

Specifically, i) using the PUCCH group for PUCCH grouping for each TRP means that the UE identifies the TRP that is the target of UCI through the configured PUCCH group, and, accordingly, the case where the OFDM symbols of the PUCCH resources toward each TRP overlap may mean an operation of determining whether to perform UCI multiplexing or whether to transmit only one UCI without multiplexing and drop the remaining UCIs.

ii) Using the PUCCH group to simultaneously update the spatial relation information of the PUCCH resources means that it may be used to simultaneously update the spatial relation information of the PUCCH resources belonging to the same PUCCH group to the same value at once. In other words, the spatial relation information may be updated for each PUCCH group at once, and the same spatial relation information may be configured/applied to one PUCCH group.

In addition, iii) using the PUCCH group for transmittable PUCCH grouping for each UE panel means that each PUCCH group may be related to a panel of the UE. It may be defined so that the PUCCH group may be connected to a panel of the UE, the PUCCH resource of the PUCCH group 1 may be transmitted through the UE panel 1, and the PUCCH resource of the PUCCH group 2 may be transmitted through the UE panel 2.

For example, when a PUCCH group is set according to the proposal of Method 2-2, that is, when the PUCCH group is grouped using a closedloopindex, the PUCCH resources for which the same closedloopindex is set may receive the same UE panel ID. Conversely, the PUCCH resources configured with the same UE panel ID need to be configured with the same closedloopindex.

The PUCCH groups for i), ii) and/or iii) described above may be configured independently. And/or the common PUCCH group may support all or part of the functions of i), ii) and/or iii) described above for signaling overhead reduction. In this case, the base station may configure what function the PUCCH group supports to the UE through RRC.

On the other hand, the above-described i) using the PUCCH group for PUCCH grouping for each TRP is necessary in order to independently report the UCI of each TRP without multiplexing when the backhaul delay is large in multiple DCI-based MTRP transmission environments. However, even in multiple DCI-based MTRP transmission environments, the backhaul delay is small, so UCIs of different TRPs may be multiplexed, or in a single DCI-based MTRP transmission environment, or in a single TRP transmission environment, PUCCHs for PUCCH grouping for each TRP Using groups may be inappropriate. (Whether UCIs of different TRPs can be multiplexed in multiple DCI-based MTRPs may be notified by the base station to the UE through separate signaling (for example, RRC signaling or signaling indicating whether to report A/N of different TRPs as a joint codebook or a separate codebook)).

Accordingly, in this case, the PUCCH group may be used for ii) updating spatial relationship information of the PUCCH resources at once or iii) for transmitting PUCCH grouping for each UE panel. In this case, the PUCCH set (i.e., PUCCH resource set) may be configured as follows.

In one set, both the PUCCH resource of PUCCH group 1 and the PUCCH resource of PUCCH group 2 may exist, and the PRI may indicate/point to PUCCH resources within a set composed of a union of PUCCH resources of PUCCH group 1 and PUCCH resources of PUCCH group 2. For this purpose, the sum of the number of PUCCH resources of group 1 and PUCCH resources of group 2 existing in each set should be set to 32, 8, 8, 8, or less for sets 0, 1, 2, and 3, respectively. For example, when PUCCH resources 1, 2, 3, and 4 belonging to PUCCH group 1 and PUCCH resources 5, 6, 7, and 8 belonging to PUCCH group 2 exist in set 1, 3-bit PRI may indicate/point to one of PUCCH resources 1, 2, 3, 4, 5, 6, 7, and 8 in set 1.

<Proposal 3>

Proposal 3 of the present disclosure proposes a multiplexing/drop method when overlapping/collision of uplink channel (for example, PUCCH/PUSCH) resources for each TRP occurs in multiple DCI-based MTRP transmissions.

Describing the contents of UCI multiplexing of NR Rel-15, when the overlapping between PUCCH and PUCCH or PUCCH and PUSCH occurs, multiplexing (i.e., UCI multiplexing) for UCI may be performed. The occurrence of the overlapping between PUCCH and PUCCH or between PUCCH and PUSCH means that resources for a plurality of PUCCH transmissions or resources for PUCCH and PUSCH transmission overlap. The UCI multiplexing refers to multiplexing between different UCI types. For example, the multiplexing between HARQ-ACK, SR, and/or CSI may correspond to the UCI multiplexing. The UCI multiplexing may be referred to as a PUCCH merging scheme. The UCI multiplexing may be configured as a two-step procedure.

Step 1 may determine a set of non-overlapping PUCCH resource(s) for UCI multiplexing (in time) by merging sets of overlapping PUCCH resources (regardless of whether PUSCH(s) exists). Specifically, in the case of step 1, while the PUCCH resources overlap in the slot, the PUCCH resource (for example, resource A) overlapping with other PUCCH resources having the earliest start time (and maximum duration) may be determined, a PUCCH resource set overlapping with resource A (for example, set X) may be determined, one PUCCH resource for multiplexing the UCI of resource A and the PUCCH resource of set X may be determined, and set X (including resource A) may be replaced with the determined PUCCH resource.

In step 2, when the result PUCCH resource(s) in step 1 overlaps with PUSCH(s), UCIs may be multiplexed on the overlapping PUSCH, otherwise, UCIs may be multiplexed on the determined PUCCH resource and transmitted.

Hereinafter, an example of UCI multiplexing in the case where PUCCH and PUCCH overlap will be described in detail.

1) UE Procedure for Reporting HARQ-ACK (i.e., ACK/NACK) and SR

When the UE needs to transmit (i) a positive or negative SR in a resource using PUCCH format 0/1 in a slot and (ii) transmit HARQ-ACK information in a resource using PUCCH format 0: In case of the positive SR, the HARQ-ACK may be transmitted in a resource of ACK/NACK PUCCH format 0 together with an additional cyclic shift (CS) offset. In case of the negative SR, the HARQ-ACK may be transmitted in a resource of ACK/NACK PUCCH format 0 without the CS offset.

When the UE has to transmit (i) the positive or negative SR in the resource using the PUCCH format 0 in the slot and (ii) transmit the HARQ-ACK information in the resource using the PUCCH format 1, the UE may transmit only the PUCCH including the HARQ-ACK information bit in the resource using the PUCCH format 1 (dropping the SR).

When the UE needs to transmit (i) the positive or negative SR in the resource using the PUCCH format 1 and (ii) transmit the HARQ-ACK information in the resource using the PUCCH format 1: In the case of the positive SR, the HARQ-ACK may be transmitted through (corresponding) SR PUCCH format 1 resource. In the case of the negative SR, the HARQ-ACK may be transmitted through an ACK/NACK PUCCH format 1 resource.

When the UE needs to transmit (i) the positive or negative SR in the resource using the PUCCH format 0/1 and (ii) transmit the HARQ-ACK information in the resource using the PUCCH format 2: In the case of the configured K SR PUCCH, a ceil (log 2 (K+1)) bit indicating (all) negative or positive SR (ID) is added to the HARQ-ACK bit, and the combined (i.e., multiplexed) UCI may be transmitted in ACK/NACK PUCCH format 2/3/4 resources.

Table 10 shows an example of a pre-set rule/method related to multiplexing (i.e., PUCCH merging) between the ACK/NACK PUCCH format and the SR PUCCH format described in 3GPP TS 38.2.1.3 section 9.2.5.

TABLE 10

If a UE would transmit a PUCCH with $O_{ACK}$ HARQ-ACK information bits in a resource using
PUCCH format 2 or PUCCH format 3 or PUCCH format 4 in a slot, as described in Subclause
9.2.3, $\lceil \log_2(K + 1) \rceil$ bits representing a negative or positive SR, in ascending order of the value
of schedulingRequestResourceId, are appended to the HARQ-ACK information bits and the UE
transmits the combined $O_{UCI} = O_{ACK} + \lceil \log_2(K + 1) \rceil$ UCI bits in a PUCCH using a resource with
PUCCH format 2 or PUCCH format 3 or PUCCH format 4 that the UE determines as described in
Subclauses 9.2.1 and 9.2.3. An all-zero value for the $\lceil \log_2(K + 1) \rceil$ bits represents a negative SR
value across all K SRs.

2) UE Procedure for CSI and SR Report

When the UE needs to transmit (i) the positive or negative SR in the resource using the PUCCH format 0/1 and (ii) transmit the CSI in the resource using the PUCCH format 2: In the case of configured K SR PUCCH, ceil (log 2 (K+1)) bits indicating (all) the negative or positive SR (ID) may be added to the CSI feedback bit and the combined UCI may be transmitted in CSI PUCCH format 2/3/4 resources.

Table 11 shows an example of a pre-set rule/method related to multiplexing (i.e., PUCCH merging) between the CSI PUCCH format and the SR PUCCH format.

TABLE 11

If a UE would transmit a PUCCH with $O_{CSI}$ CSI report bits in a resource using PUCCH format 2
or PUCCH format 3 or PUCCH format 4 in a slot, $\lceil \log_2(K + 1) \rceil$ bits representing corresponding negative or positive SR, in ascending order of the values of schedulingRequestResourceId, are prepended to the CSI information bits as described in Subclause 9.2.5.2 and the UE transmits a PUCCH with the combined $O_{UCI} = \lceil \log_2(K + 1) \rceil + O_{CSI}$ UCI bits in a resource using the PUCCH
format 2 or PUCCH format 3 of PUCCH format 4 for CSI reporting. An all-zero value for the $\lceil \log_2(K + 1) \rceil$ bits represents a negative SR value across all K SRs.

3) UE Procedure for Reporting HARQ-ACK/SR and CSI when PUCCH Resource Indicator (PRI) is Indicated HARQ-ACK/SR and CSI may be transmitted through an AN PUCCH resource.

One PUCCH resource set may be selected from several sets based on the total UCI payload size. The PUCCH resource in the selected set may be indicated by the PRI signaled in the DL scheduling DCI. In addition, the number of (actually used) PRBs in the PUCCH resource may be determined based on the total UCI size NUCI and the maximum coding rate R set according to the PUCCH format. The minimum number of PRBs that may transfer the total UCI size NUCI with the coding rate R may be selected.

4) UE Procedure for Reporting HARQ-ACK/SR and CSI when PRI is not Indicated

HARQ-ACK/SR and CSI may be transmitted through a CSI PUCCH resource.

Based on the total UCI payload size NUCI and the maximum coding rate R, a PUCCH resource may be selected from multiple CSI PUCCH resources. A resource capable of transferring the minimum UCI capacity (e.g., {#of Res}×R) and the total UCI size NUCI may be selected. The number of (actually used) PRBs in the PUCCH resource may be determined based on the total UCI size NUCI and the maximum coding rate R.

5) UCI Multiplexing on PUCCH According to Combination Between ACKNACK PUCCH Format and CSI PUCCH Format Table 12 shows an example of UCI multiplexing on PUCCH according to the combination between the ACKNACK PUCCH format and the CSI PUCCH format. In the case of Part2 CSI report in PUCCH, a plurality of PRBs for the PUCCH resource and the corresponding PUCCH resource may be determined based on the UCI payload size under the assumption that the CSI report is rank 1.

be a problem in applying the UCI multiplexing to the MTRP. Therefore, proposal 3 of the present disclosure specifically proposes a UCI multiplexing/dropping method for M-TRP.

<Proposal 3-1>

Proposal 3-1 of the present disclosure proposes a method of multiplexing or dropping UCI when PUCCH resources for transmitting UCI corresponding to each TRP overlap/collide in multiple DCI-based M-TRP operations.

For convenience of description, two TRPs (for example, TRP 1 and TRP 2) are mainly described in the case of cooperative transmission, but do not limit the scope of the present disclosure. Therefore, of course, it may be applied even when three or more TRPs are cooperatively transmitted. That is, it is obvious that the same may be applied even when transmitting a plurality of PUCCHs for N (N>2) N TRPs.

In addition, for convenience of description, (i) UCI for TRP 1 is represented by UCI 1, PUCCH in which UCI 1 is transmitted is represented by PUCCH 1, (ii) UCI for TRP 2 is represented by UCI 2, PUCCH in which UCI 2 is transmitted is represented by PUCCH 2. When the PUCCH 1 and PUCCH 2 collide/overlap, a priority rule (or dropping rule) is proposed.

Method 3-1)

The method of transmitting UCI may vary depending on whether the PUCCH resource corresponding to each TRP belongs to the same PUCCH group (i.e., PUCCH resource group) or to a different PUCCH group. The PUCCH group may be configured based on the above-described proposal 2.

When UCI multiplexing of different TRPs is not supported in multiple DCI-based MTRPs, the multiplexing/dropping UCIs of different TRPs is performed as follows.

When the PUCCHs of different UCIs (for example, SR, P/SP CSI, A/N, etc.) are configured to be transmitted in the same OFDM symbol (i.e., overlapping/collision of OFDM symbols occurs), the PUCCHs belong to the same PUCCH group, the existing (Rel-15 NR) multiplexing/drop method is used as it is. That is, one UCI information is generated by

TABLE 12

|  | PUCCH-Format2-simultaneous-HARQ-ACK-CSI = True/ Determined resource with ACKNACK/SR + CSI is Format 2 | PUCCH-Format3/4-simultaneous-HARQ-ACK-CSI = True/ Determined resource with ACKNACK/SR + CSI is Format 3/4 |
| --- | --- | --- |
| CSI configured with Format 2 | Jointly encode ACKNACK and CSI report | Jointly encode ACKNACK and CSI report |
| CSI configured with Format 3/4 | Jointly encode ACKNACK and CSI Part 1. Drop CSI Part 2. | Jointly encode ACKNACK and CSI Part 1 at the configured max code rate Separately encode CSI Part 2 using the remaining resources (if any) in the PUCCH |

The above-described UCI multiplexing is an operation that does not consider the M-TRP operation, and there may multiplexing or dropping all UCIs to be transmitted on overlapping PUCCHs, and then the generated UCI is transmitted as one PUCCH. That is, the UE may transmit the UCI generated by the TRP corresponding to the PUCCH group.

On the other hand, when PUCCHs of different UCIs (for example, SR, P/SP CSI, A/N, etc.) are configured to be transmitted in the same OFDM symbol (i.e., overlapping/collision of OFDM symbols occurs), if the PUCCH belongs to another PUCCH group, the following operation may be performed according to UCI contents. The UCI contents may be expressed as a UCI type, a UCI type, etc., and the HARQ-ACK information (i.e., ACK/NACK), SR, CSI, LRR, etc. may correspond to the UCI type and contents. The PUCCH belonging to different PUCCH groups may refer to PUCCH resources each scheduled with DCI received from CORESETs included in different CORESET groups.

i) When the SR PUCCH and the A/N PUCCH overlap, the SR PUCCH is dropped and the A/N PUCCH is reported. This is because, when the A/N is dropped, the base station needs to retransmit the DCI and PDSCH, and therefore, the DL resource efficiency is lowered.

ii) When the CSI PUCCH and the A/N PUCCH overlap, the CSI PUCCH is dropped and the A/N PUCCH is reported. This is because, when the A/N is dropped, the base station needs to retransmit the DCI and PDSCH, and therefore, the DL resource efficiency is lowered.

iii) When the A/N PUCCH and A/N PUCCH overlap, if the DAI value is large, since the A/N for more PDSCHs is reported, the A/N PUCCH with a large DAI value is reported and the remaining A/N PUCCH is dropped. When the DAI value is the same, the A/N PUCCH with a low PUCCH group index is reported.

iv) When the SR PUCCH and the CSI PUCCH overlap, the PUCCH with a low PUCCH group index is reported. Alternatively, the CSI is reported first and the SR is dropped. Alternatively, the SR is reported first and the CSI is dropped. The base station may instruct the UE which UCI to prioritize.

v) When the SR PUCCH and SR PUCCH overlap, the PUCCH with a low PUCCH group index is reported.

vi) When the CSI PUCCH and the CSI PUCCH overlap, the PUCCH with a low PUCCH group index is reported.

vii) Alternatively, the UE may not report both UCI PUCCHs or may not expect a corresponding operation. That is, the base station does not configure/instruct the UE to transmit different PUCCHs on overlapping resources. In this case, the UE may randomly select and report one of the two UCIs.

Examples of priorities of i) to vii) above may be applied independently, or two or more may be applied in combination.

Method 3-2)

According to the above-described proposed method, when two PUCCHs belonging to two different PUCCH resource groups collide/overlap, one PUCCH/UCI is dropped according to the type of UCI (/contents) reported in each PUCCH, and the other PUCCH/UCI may be reported. However, the method has a disadvantage in that the UE implementation becomes complicated as each dropping rule (or priority rule) is defined for each UCI type when the PUCCHs collides. Therefore, it is desirable to define a more general dropping rule and determine the dropped PUCCH/UCI by applying the defined dropping rule in the case of the PUCCH collision. For this, the following dropping rule is proposed.

For example, a priority rule according to the type of UCI (/contents) may be predefined. Hereinafter, priority 1/2/3/4 for each type of UCI shows examples of priority rules proposed in the present disclosure, and one of the priority rules below may be followed. However, since the priority rule is not limited thereto, it goes without saying that another priority rule may be defined/set based on the UCI type/content/type.

1) Priority for each UCI type 1: A/N>SR>AP CSI>SP/P CSI (i.e., A/N has the highest priority)

2) Priority 2 for each UCI type: SR>A/N>AP CSI>SP/P CSI

3) Priority 3 for each UCI type: SR (SR for URLLC data)>A/N>SR (SR for eMBB data)>AP CSI>SP/P CSI 4) Priority 4 for Each UCI Type: A/N>SR=CSI (i.e., SR and CSI have the Same Priority)

For example, since the data retransmission occurs when the A/N is dropped, DL resource efficiency decreases and DCI overhead increases. Therefore, it may be preferable to report A/N in preference to other UCI types (for example, SR/CSI). In addition, since the URLLC data should be transmitted with low latency, it may be preferable that the SR of the URLLC data be reported in preference to other UCI types.

For example, it may be fixed (predefined) to one of the priority rules (e.g., priority 1/2/3/4 for each UCI type) for determining the priority of UCI. Alternatively, the base station may determine one of the priority rules (e.g., priority 1/2/3/4 for each UCI type) and instruct the UE through RRC signaling. As an example, one of indices corresponding to/pointing to each priority rule may be indicated/set.

Alternatively, the base station may determine an arbitrary UCI priority and instruct the UE through RRC signaling. For example, in order to indicate the priority of A/N, SR, and CSI, 2 bits are allocated for each UCI type, and it may be set to have a higher priority as the value corresponding to 2 bits decreases (or increases). As an example, 2 bits of A/N may be set to 00, SR may be set to 01, and CSI may be set to 10 to indicate that a UCI of a small value has a higher priority. In this case, with A/N as the highest priority, the priority is lowered in the order of the SR and CSI.

When the transmission times of the plurality of PUCCHs transmitting multiple UCIs of TRP 1 overlap (i.e., collision of time resources occurs), the UE selects one PUCCH resource according to the existing UCI multiplexing rule and determines/multiplexes the UCI (e.g., UCI 1) to be reported through the resource. When the transmission times of the plurality of PUCCHs transmitting multiple UCIs of TRP 2 overlap (i.e., collision of time resources occurs), the UE selects one PUCCH resource according to the existing UCI multiplexing rule and determines/multiplexes the UCI (e.g., UCI 2) to be reported through the resource. This operation corresponds to UCI multiplexing of the conventional STRP.

When PUCCH (for example, PUCCH 1) for TRP 1 and PUCCH (for example, PUCCH 2) for TRP 2 overlap, by comparing the UCI (for example, UCI 1) with the highest priority among UCIs transmitted through PUCCH for TRP 1 with the UCI (for example, UCI 2) with the highest priority among UCIs transmitted through PUCCH for TRP 2, it is possible to report the UCI and PUCCH to which the UCI of higher priority belongs, and drop the rest.

For example, when the UCI priority rule is applied based on Priority 1 for each UCI type, when UCI 1={A/N, SR}, UCI 2={SR, CSI}, by comparing the priority of the A/N, which is the UCI with the highest priority of the UCI 1 with the priority of the SR which is the UCI with the highest priority of the UCI 2, the A/N has a higher priority. Accordingly, the UE may report the UCI 1 through the PUCCH corresponding to the UCI 1 and drop the UCI 2 and the PUCCH corresponding to UCI 2.

Examples of the priority rule define priorities among A/N, SR, and CSI, but UCI type/contents are not limited thereto. The Rel-16 NR UE may report a beam failure recovery request (BFRQ) to the base station as UCI upon beam failure detection for the Scell. The BFRQ may be expressed/replaced by a link recovery request (LRR). In this case, the priority rule may be defined/set in consideration of up to BFRQ.

For example, the BFRQ may have a higher priority than the A/N when determining the priority for each type of UCI described above. Also, the BFRQ may have a higher priority than the SR. More precisely, the BFRQ may have the same or lower priority than the SR for URLLC data, and may have a higher priority than other SRs (for example, SR for eMBB data). Alternatively, the BFRQ may be determined to have a higher priority than the SR but a lower priority than the A/N. Alternatively, the BFRQ may have i) a higher priority than all other UCIs in the proposed priority rule (e.g., priority 1/2/3/4 for each UCI type), or ii) the same priority as the highest priority UCI.

For example, when the BFRQ has a higher priority than other UCI types, priority 1 for each UCI type described above may be changed as follows: BFRQ>A/N>SR>AP CSI>SP/P CSI.

For example, when the BFRQ has the same priority as the highest priority UCI, the above-mentioned priority 2 for each type of UCI may be changed as BRFQ=SR>A/N>AP CSI>SP/P CSI.

In addition, the BFRQ may be defined as one of the SR configurations, and when the SR is reported in an SR configuration designated as the BFRQ, the SR may mean the BFRQ. For example, when four SR configurations are instructed to the UE, the SR configuration 0 having the lowest SR configuration index may be designated for BFRQ use.

On the other hand, when the UCI of the highest priority of UCI 1 and the UCI of the highest priority of UCI 2 are the same, that is, when each UCI has the same priority, the UE may perform one of the following operations 1 to 6.

Operation 1: The UE does not expect to report both UCI PUCCHs. That is, the base station may not indicate/configure to report two UCI PUCCHs. In this case, the UE may randomly select and report one of the two UCI/PUCCHs.

Operation 2: By comparing the PUCCH group index, the PUCCH/UCI belonging to the PUCCH group of the low index may be reported and the rest may be dropped (Alternatively, by comparing the PUCCH group index, it is possible to report the PUCCH/UCI belonging to the PUCCH group of a high index and drop the rest.)

Operation 3: By comparing the CORESET group index, the UCI and PUCCH related to the CORESET group of the low index may be reported and the rest may be dropped. (Alternatively, by comparing the CORESET group index, the UCI and PUCCH related to the CORESET group of a high index may be reported and the rest may be dropped.) The association between the UCI and the CORESET group may be determined as follows. The A/N may be identified/determined through the CORESET group through which the DCI scheduling the A/N is transmitted, and the CSI (e.g., semi-persistent/periodic CSI) and SR may be identified/determined through the CORESET group indicated in CSI-ReportConfig and SchedulingRequestResourceConfig, respectively. (Aperiodic (AP) CSI is also identified through the CORESET group in which the DCI scheduling the AP CSI is transmitted.)

Operation 4: Long PUCCH may be reported in preference to short PUCCH.

Operation 5: By comparing the UCI payload sizes, the UCI/PUCCH with a large payload may be reported and the rest may be dropped.

Operation 6: It is possible to report UCI/PUCCH composed of many serving cells by comparing the number of UCIs of UCI 1 and UCI 2, respectively, and drop the rest. For example, when UCI 1={A/N for serving cell 1, A/N for serving cell 2, SR for serving cell 1,} UCI 2={A/N for serving cell 1, SR for serving cell 1}, since UCI 1 is composed of UCIs of more serving cells, UCI 1/PUCCH may be reported and the rest may be dropped.

For example, it is assumed that it is based on the priority rule 1 and operation 3. Also, it may be assumed that UCI 1 includes ACK/NCK 1 and SR, and UCI 2 includes ACK/NAK and CSI. The highest priority UCI type of UCI 1 is ACK/NACK, and the highest priority UCI type of UCI 2 is also ACK/NACK. Therefore, since the priorities of UCI 1 and UCI 2 are the same, according to operation 3 above, by comparing the CORESET group index related to UCI 1 with the CORESET group index related to UCI 2, the UCI of the lower index may be reported, and the remaining UCI may be dropped.

The example in which the above-described operations 1 to 6 focus on an example in which the priority rules for each UCI type (e.g., priority 1/2/3/4 for each UCI type) are applied and then additionally used when the priorities of UCI 1 and UCI 2 are the same will be mainly described. However, the priority rule for each UCI type (e.g., priority 1/2/3/4 for each UCI type) may be used for the purpose of determining the priority of the UCI based on the above operations 1 to 6 without first applying the priority rule. For example, when the UCI/PUCCH collision occurs, operation 6 is applied immediately without considering the priority for each UCI type, and thus, it is possible to report UCI/PUCCH composed of many serving cells by comparing how many UCIs each UCI 1 and 2 are composed of, and drop the rest.

Alternatively, priorities are first applied based on operations 1 to 6, and when the priorities are the same, a priority rule (e.g., priority 1/2/3/4 for each UCI type) for each UCI type may be additionally applied. As an example, operation 6 may be applied first to compare the number of serving cells related to UCI 1 and UCI 2, and when the number of serving cells is the same, priority 1 for each UCI type may be applied.

<Proposal 3-2>

Proposal 3-2 of the present disclosure proposes a method of multiplexing or dropping UCI when a PUCCH resource for transmitting UCI for one TRP and a PUCCH resource for another TRP overlap/collide in multiple DCI-based M-TRP operations.

For convenience of description, two TRPs (for example, TRP 1 and TRP 2) are mainly described in the case of cooperative transmission, but do not limit the scope of the present disclosure. Therefore, of course, it may be applied even when three or more TRPs are cooperatively transmitted. That is, it is obvious that the same may be applied even when transmitting a plurality of PUCCHs or PUSCHs for N (N>2) N TRPs.

When the UCI multiplexing of different TRPs is not supported in the multiple DCI-based MTRP, if PUCCH transmitting UCI and PUSCH overlap, the UE may perform the following operation.

If the CORESET group index (PUSCH scheduling Coreset group index) of the CORESET in which the DCI scheduling the PUSCH is transmitted is the same as the PUCCH group index (or the COREST group index corresponding to A/N) of the UCI, it is interpreted as the PUSCH or PUCCH transmitted to the same TRP (like the UCI piggyback on PUSCH procedure of the existing Rel-15), and the UCI is transmitted on the PUSCH.

If the CORESET group index (PUSCH scheduling Coreset group index) of the CORESET in which the DCI scheduling the PUSCH is transmitted is different from the PUCCH group index of the UCI (or the COREST group index corresponding to A/N), it is interpreted as the PUSCH or PUCCH transmitted to another TRP, and the following operation may be performed. In the above description, an example of recognizing different TRPs according to whether the CORESET group index is the same has been described, but the present disclosure is not limited thereto, and the methods described below will be described under the assumption that the PUCCH and PUSCH for different TRPs overlap.

When the PUSCH and the PUCCH transmitted through different TRPs collide, the following three cases may occur depending on the contents transmitted to the PUSCH. For convenience of description, it will be described under the assumption that the PUSCH is transmitted for TRP 1 and the PUCCH is transmitted for TRP 2. Therefore, it may also be applicable to the case of transmitting the PUCCH for TRP 1 and transmitting the PUSCH for TRP 2, and it may also be applied to the operation of two or more multiple TRPs.

Case 1. PUSCH for TRP 1 (UL data)+PUCCH for TRP 2

Case 2. PUSCH for TRP 1 (UCI (e.g., SP (semi-persistence)/A (aperiodic) CSI))+PUCCH for TRP2

Case 3. PUSCH for TRP 1 (UL data+UCI (e.g., SP/A CSI or piggyback UCI))+PUCCH for TRP2

As in Case 2 or Case 3, when SP-CSI is transmitted through PUSCH, the PUSCH scheduling Coreset group index means the Coreset group index of the Coreset transmitting DCI with activated SP-CSI.

Hereinafter, when the PUSCH for TRP 1 and the PUCCH for TRP 2 collide, a dropping rule (or priority rule) will be described in detail.

Method 3-3)

When less than a specific ratio or a specific number of symbols/RBs among the allocated PUSCH resources (for example, OFDM symbol/RB) overlap, PUSCH puncturing is performed on the RE in which the overlap occurs, and if not (i.e., when more than a specific ratio or a specific number of symbol/RBs overlap), the PUSCH may be dropped and the PUCCH may be transmitted. For example, when the number of overlapping PUSCH symbols is 2 or less, puncturing is performed, otherwise, the PUSCH is dropped. Alternatively, it may be punctured or dropped according to a specific ratio. For example, when the specific ratio is set to 20%, and the total PUSCH is 10 symbols or more and the overlapping symbols are 2 symbols or less, the puncturing is performed, otherwise, the PUSCH is dropped. Such an operation may be applied regardless of UCI contents (A/N, SR, CSI), or may be applied only to specific UCI contents (e.g., A/N).

Method 3-4)

A method of preferentially reporting control information when a PUCCH and a PUSCH collide may be considered. In the case of the case 1, since the control information is more important than data, the PUCCH may be reported and the PUSCH may be dropped. Accordingly, the UE transmits PUCCH for TRP 2 and does not transmit PUSCH for TRP 1.

In Case 2, since the UCI is also transmitted in PUSCH, the UCI collision solution method of the above-described proposal 3-1 may be used. Proposal 3-1 proposed a solution for the case where the PUCCH for TRP 1 and the PUCCH for TRP 2 collide. By extending this, Proposal 3-1 may be applied regardless of the channel (PUCCH/PUSCH) reporting the UCI. However, since operations 2 and 4 described in Proposal 3-1 are applicable only to collision between two PUCCHs, they cannot be used in cases 2 and 3. In the case of operation 3, it is necessary to compare the CORESET group index related to the PUCCH with the CORESET group index related to PUSCH. The CORESET group index related to the PUSCH may be identified as the CORESET group to which the DCI scheduled for the PUSCH is transmitted.

Alternatively, the UE does not expect to schedule the PUSCH so that the PUSCH and the PUCCH collide. As a result, the base station does not schedule the PUSCH and the PUCCH so that they collide.

Method 3-5)

Depending on the type of data included in the PUSCH, data may be more important than the control channel (i.e., PUCCH). For example, since RACH Message 3 (Msg 3) is more important than general data/control information, it is not preferable to drop the PUSCH including RACH Message 3 when the PUSCH and PUCCH collide. Therefore, in this case, the PUSCH including the RACH Message 3 (Msg 3) may be transmitted and the PUCCH may be dropped. As another example, since URLLC data is more important than general data/control information, the PUSCH may be transmitted and the PUCCH may be dropped. For example, in the case of SPS PUSCH (or Configured Grant PUSCH), since it may be configured for URLLC data transmission, it may be preferable to transmit SPS PUSCH with higher priority than PUCCH.

In the case of other general UL data, the PUCCH may be reported first or the method of Proposal 3-1 may be extended and applied.

Alternatively, when the A/N is dropped, DL resource efficiency decreases and latency occurs due to retransmission. Considering this, the A/N may be transmitted in preference to PUSCH, but the remaining SR and CSI may be transmitted in preference to the PUSCH.

Method 3-6)

In NR, various types of repeated PUCCH transmission are supported. When the repeatedly transmitted PUCCH and PUSCH collide, it may be preferable to transmit the PUSCH first. In the case of the repeated PUCCH, even if the PUCCH that collides with a PUSCH is dropped, the remaining repeated PUCCH may be transmitted, so the UE may still receive the corresponding UCI through the repeated PUCCH. The repeated PUCCH may be variously repeated at a symbol level, a subslot level, or a slot level.

For example, in the case of a 2-symbol short PUCCH, since one-symbol PUCCH is repeated over two symbols, even if one symbol of the two symbols collides with the PUSCH and is dropped, the same PUCCH may be transmitted in the remaining one symbol. Similarly, in the case of the PUCCH repeatedly transmitted in several slots, if the PUSCH collides with the PUSCH in one of them, the same PUCCH may be transmitted in the remaining slots even if the PUCCH is dropped. Therefore, the PUSCH may be transmitted in preference to the repeated PUCCH.

In the case of collision between PUCCHs or PUCCH and PUSCH for different TRPs in the above-mentioned proposal 3 (including proposal 3/1/2), the multiplexing or dropping method based on a priority rule (or dropping rule) has been described. However, when the UE has multiple Tx panels and may transmit multiple UL channels at the same time (same OFDM symbol) through multiple Tx panels, even in the overlap between the PUCCH and PUSCH (targeting different TRPs) or the overlap between the PUCCH and PUCCH (targeting another TRP) occurs, both may be transmitted independently (without multiplexing or piggyback). On the other hand, when the UE has a single Tx panel, the UCI dropping may be performed based on the methods of Proposal 3 above.

Accordingly, whether the UE supports transmission of a plurality of UL channels simultaneously through a plurality of TX panels may be reported to the base station as UE capability information. In consideration of the implementation complexity, the UE may be divided into a UE capable of performing the operation and a UE not capable of performing the operation, and may report it to the base station as its capability. If the UE is a UE that may not transmit multiple UL channels at the same time, the base station configures the UE so that any PUCCH resource of PUCCH group 1 and any PUCCH resource of PUCCH group 2 are TDMed, and thus, it is possible to exclude a case where the overlap of PUCCHs of different TRPs occurs, and a case where PUCCH and PUSCH for different TRPs overlap can also be excluded. Alternatively, a UE that may not transmit multiple UL channels at the same time may ignore DCI scheduling the corresponding PUSCH when the PUCCH and PUSCH for different TRPs overlap. Alternatively, a UE that may not transmit multiple UL channels at the same time may ignore DCI scheduling the corresponding PUCCH when the PUCCH and PUCCH for different TRPs overlap.

Based on the method described in Proposal 3/Proposal 3/Proposal 3-2, etc., when resources of PUCCHs for different TRPs overlap or resources of PUCCH and PUSCH overlap, information with higher priority without ambiguity may first be transmitted.

<Proposal 4>

Proposal 4 proposes a method of configuring a HARQ-ACK codebook for multiple TRPs in relation to HARQ-ACK information included in UCI.

The NR standard supports two schemes, namely, a Type-1 HARQ-ACK codebook and a Type-2 HARQ-ACK codebook. A summary of each codebook method is as follows.

In the case of the Type-1 HARQ-ACK codebook, a HARQ-ACK codebook (i.e., a set of HARQ information bits (set)) is defined for reception of one or more candidate PDSCHs (candidate PDSCH reception) capable of transmitting HARQ-ACK information in PUCCH/PUSCH to be transmitted in a specific slot (for example, nth slot (slot #n)). Even when actual PDSCH transmission is not performed, bit(s) for corresponding PDSCH reception may be defined in the HARQ-ACK codebook. It is defined to transmit a NACK when the UE recognizes that PDSCH transmission is not performed (including a case where PDCCH detection fails).

HARQ-ACK information with 1 bit or 2 bits may be configured according to the "maxNrofCodeWordsScheduledByDCI" value, which is a higher layer parameter indicating the maximum number of codewords (CWs) for a single occasion for a candidate PDSCH reception. When "harq-ACK-SpatialBundlingPUCCH" is configured for the UE, the HARQ-ACK information may be configured as 1 bit.

Specifically, when there is an occasion for candidate PDSCH reception in response to a PDCCH having DCI format 1_1, and "maxNrofCodeWordsScheduledByDCI" indicates reception of 2 transport blocks, if the UE receives a PDSCH including one transport block, i) when "harq-ACK-SpatialBundlingPUCCH" is not configured, the UE generates HARQ-ACK information related to the first transport block and NACK for the second transport block, and ii) when "harq-ACK-SpatialBundlingPUCCH" is configured, HARQ-Ack information may be generated as ACK for the second transport block.

In the case of the Type-2 HARQ-ACK codebook, the codebook that transmits the HARQ-ACK information to the same PUCCH/PUSCH based on the counter downlink assignment indicator (C-DAI) and total DAI (T-DAI) values indicated in the actually transmitted PDCCH is defined. That is, the codebook is configured based on the PDCCH information transmitted to the actual UE. When the UE fails to detect a specific PDCCH, it transmits a NACK to a bit for the corresponding PDCCH among bits defined in the codebook. In this case, whether the PDCCH detection has failed may be recognized by the UE through the C-DAI and T-DAI values.

The value of the C-DAI field in the DCI format is the accumulative number of {serving cell, PDCCH monitoring occasion}-pair(s) of PDSCH reception or SPS PDSCH release related to the DCI format that exists up to the current serving cell and the current PDCCH monitoring occasion. Here, the ascending order of the serving cell index is followed, followed by the ascending order of the PDCCH monitoring occasion. The value of the T-DAI in the DCI format represents the total number of {serving cell, PDCCH monitoring occasion}-pair(s) of PDSCH reception or SPS PDSCH release related to the DCI format that exists up to the current PDCCH monitoring occasion.

Method 4-1)

When configuring the A/N codebook transmitted in one slot (or one sub-slot), the DCI (or PUCCH resource for A/N transmission) scheduling the PDSCHs to be the target of the A/N and DCI scheduling the transmission time (time) is configured as one A/N codebook when the CORESET group index of the transmitted CORESET is the same, otherwise (i.e., when the CORESET group index is different), it may be configured as different A/N codebooks.

As described above, since the TRPs may be distinguished based on the CORESET group index, when the CORESET group index is the same, it may be determined that the DCI is received from one TRP related to the corresponding index. Accordingly, the UE may configure one A/N codebook for one TRP and feed it back to the base station. On the other hand, when the CORESET group index is different, it may be determined that the DCI is received from each of a plurality of TRPs related to each index, and the UE may separately configure the A/N codebook for each TRP, and may transmit it to each TRP.

In this case, exceptionally, A/N for RACH message 4 may be transmitted regardless of CORESET. For example, it is not reported by composing one codebook with another A/N, and only the corresponding A/N (1 bit) may be reported alone. Unlike the A/N for the existing PDSCH, since it is a process in which the UE, not in the RRC connected state, approaches to become the RRC connected state, the A/N of the RACH and the A/N of the PDSCH may be separated and reported independently without multiplexing.

Regarding the DCI for the release command of the semi-persistence scheduled PDSCH, the UE reports the A/N for the DCI, the A/N is configured in which A/N codebook, and whether the A/N is configured in any A/N codebook may be determined according to the CORESET group index of the CORESET to which the DCI for the release command is transmitted.

Method 4-2)

In the MTRP transmission method, as a method of configuring whether to configure the A/N of two TRPs as one codebook (i.e., joint A/N codebook) or separate codebooks (i.e., separate A/N codebook), the following Alts (individually or in combination) is being discussed.

Alt 1: How to use new RRC signaling for switching joint A/N feedback and separate A/N feedback.

Alt 2: When the higher layer signaling index (for example, CORESETPoolIndex) set in CORESET corresponding to different TRPs has a different value, how to use separate A/N feedback is used, otherwise (including the case where the index is the same/index is not set), how to use joint A/N feedback like Rel-15.

In order for Alt 2 to operate, the UE needs to first be able to distinguish the CORESETs of different TRPs, and a codebook configuration method (i.e., joint or separate codebook) for A/N transmission may be determined depending on whether the index set in the CORESET of different TRPs is the same or different.

However, when the UE distinguishes the TRP by the index set in the CORESET, the Alt 2 method may not operate. In this case, this is because the UE identifies two CORESETs with the same index as CORESETs of the same TRP. In fact, when two CORESETs with the same index are CORESETs of different TRPs, the UE needs to double the codebook size when constructing a semi-static codebook (the semi-static codebook size is determined through a pruning process based on K1 (PDSCH to A/N time offset) and SLIV. In the case of 2 TRP transmission, since two PDSCHs can be transmitted/received at the same time, the codebook size is doubled). This is because the A/N for PDSCH of two TRPs is composed of one joint codebook. However, since the UE interprets that two CORESETs with the same index are CORESETs of the same TRP, the UE may have a problem of incorrectly configuring the codebook with the codebook size for single TRP transmission according to the operation of the existing Rel-15.

In order to solve the above problem, it may be promised that an index in CORESET may not be set when a specific serving cell is a single TRP transmission, but an index may be set in the case of a plurality of TRP transmissions. That is, when an index is not set in (all) CORESETs set in one serving cell, the A/N codebook is configured in the same way as in the existing Rel-15. An index is set in two or more CORESETs of CORESETs configured in one serving cell, and when the indexes are all the same, the UE may configure the A/N of the two TRPs as a joint codebook. In this case, the semi-static codebook size is composed of the sum of the codebook size of TRP1 and the codebook size of TRP2. An index is set in two or more CORESETs of CORESETs configured in one serving cell, and when different indexes exist, the UE may configure the A/N of the two TRPs as a separate codebook. That is, when there is a CORESET with an index set among CORESETs configured in one serving cell, it is promised that multiple DCI-based MTRP transmission methods are applied, and when the set index values are all the same, it is assumed that the joint codebook is configured, and when the set index values are different, it is assumed that the separate codebook is configured.

The joint codebook means that the A/N of PDSCH scheduled by DCI of different CORESETs is configured as one A/N codebook and reported using one PUCCH. The separate codebook means configuring the A/N of PDSCH scheduled by DCI of different CORESETs as different A/N codebooks and reporting each codebook as a different PUCCH resource. When the PUCCH resources of different codebooks overlap in the separate codebook, both PUCCHs are reported according to the capability of the UE, or only one PUCCH of the two PUCCHs is reported and the other PUCCH is dropped. When PUCCH resources of different codebooks overlap in the separate codebook, the above-described methods of proposal 3 may be applied.

(Method 4-3)

According to the current NR specification, when configuring the semi-static A/N codebook, the UE does not expect to receive SPS PDSCH release and unicast PDSCH in a same slot.

As a result, the A/N corresponding to a specific bit of the semi-static codebook corresponds to A/N for SPS PDSCH release DCI or A/N for unicast PDSCH. If SPS PDSCH release DCI and unicast PDSCH are transmitted together, one may be ack and the other may be nack (in this case, there is a problem in that two conflicting A/N information need to loaded in one bit), this is to exclude such cases.

In the case of the M-TRP transmission, when A/N of two TRPs is configured as a joint codebook in one semi-static A/N codebook, since A/N bits of TRP 1 and 2 exist respectively, it should be modified so that the above scheduling is not expected for each TRP. That is, it needs to be modified as follows.

The UE does not expect to receive SPS PDSCH release and unicast PDSCH in a same slot, if index in CORESET where SPS PDSCH release DCI is transmitted and index in CORESET where unicast PDSCH scheduling DCI is transmitted are the same.

When this contents are applied, the UE may simultaneously receive the SPS PDSCH release DCI of TRP 1 and the unicast PDSCH of TRP 2, and conversely, the SPS PDSCH release DCI of TRP 2 and the unicast PDSCH of TRP 1 may be simultaneously received.

(Proposal 5)

In the multiple DCI-based MTRP transmission scheme, when two TRPs perform NCJT on two PDSCHs, the DCI of each PDSCH may be limited to searching within a UE specific search space (USS). This is because the PDSCH scheduled through a common search space (CSS) is not suitable for the MTRP transmission method or because it is a broadcast PDSCH transmitted to multiple UEs or a fallback unicast PDSCH.

Additionally, since format 1-1 among DCI formats transmittable in the USS is a non-fallback unicast PDSCH, it is proposed to apply only the PDSCH scheduled through DCI format 1-1 to the MTRP transmission scheme. For example, the UE detects DCI format 1-1 transmitted from the USS, and may know that the PDSCH scheduled for the DCI is transmitted through the NCJT.

Additionally, among RNTIs used for CRC masking of format 1-1, CS-RNTI is used for SPS PDSCH scheduling, so it is not preferable to apply NCJT that is optimized for dynamic channel/traffic conditions and transmitted. That is, the NCJT transmission is not applied to the PDSCH scheduled by format 1-1 using CS-RNTI. Among RNTIs used for CRC masking of format 1-1, the NCJT transmission is supported for C-RNTI and MCS-C-RNTI. For example, when the UE detects DCI format 1-1 transmitted from the USS, and the DCI is CRC-masked with C-RNTI or MCS-C-RNTI, it may be known that the PDSCH scheduled with the DCI is transmitted with the NCJT.

In addition, since CORESET 0 may be mainly used for the purpose of transmitting initial access or system information/paging information, the PDSCH scheduled by DCI transmitted through CORESET 0 may not support NCJT transmission.

<Proposal 6>

When the PUCCH transmission time is set in units of sub-slots and PUCCH transmission is possible, the TDM transmission may be performed within one slot by allocating PUCCHs for different TRPs to different sub-slots. For example, in case of coordination between TRPs so that only TRP 1 PUCCH transmission is possible in even subslots and only TRP 2 subslot transmission is possible in the remaining subslots, the PUCCHs for two TRPs do not collide with each other within one slot.

For the PDSCH to PUCCH time offset K1 value, a set of K1 values is configured through the RRC, and a value in the set is selected through the DCI. That is, the set may include a plurality of K1 values. (In this case, K1 may be interpreted in units of subslots, not in units of existing slots) When two TRPs share one set of K1, only half of the subslots that TRP 1 may transmit is DCI, so only half of the sets of K1 may be selected as the DCI. Therefore, it is proposed to separately set K1 set for each TRP and select from the K1 set of TRP when selecting K1 value through the DCI transmitted by each TRP. (TRP may be known through the index set in the CORESET, so a different K1 set needs to be set for each index.)

Another method may solve the problem by sharing the K1 set as one, but increasing the set size. For example, when the existing K1 set is composed of N values, the set size is increased to 2N values and the K1 selection bit of the DCI is also increased by 1 bit. To this end, the base station instructs the UE the field size for K1 indication in the DCI.

In subslot unit PUCCH transmission, since PUCCH OFDM symbols may not exceed subslot units, a limitation is applied to the number of PUCCH symbols. As a result, the PUCCH coverage problem occurs. To solve this, PUCCH repetition may be used. That is, the same PUCCH is repeatedly transmitted several times. The method of repeatedly transmitting the same PUCCH in an adjacent subslot after the first PUCCH transmission has the following problem. Since adjacent subslots are coordinated so that different TRPs are used for the PUCCH transmission, the repeated transmission in adjacent subslots is not possible. Therefore, the time unit of the repeated transmission should be a slot unit, not a subslot. That is, if one PUCCH is transmitted in the i-th subslot of slot n, the next PUCCH is transmitted in the i-th subslot of slot n+1 and the next PUCCH is transmitted in the i-th subslot of slot n+2.

<Proposal 7>

In the current NR standard, a method of simultaneously updating/indicating spatial relation information (for example, PUCCH-SpatialRelationInfo) of PUCCH resources belonging to the same PUCCH resource group is being considered.

Specifically, in order to support simultaneous update/indication of a single spatial relationship per PUCCH group using one MAC CE, the following configuration options may be supported for the group. At least two groups may be set per BWP. For example, in the case of at least multiple TRP (MTRP)/multi-panel, each group may correspond to different TRP/panels. For example, in the case of at least a single TRP (STRP), each group may correspond to different active spatial relationships.

The PUCCH resource group (i.e., a group for spatial relation) related to this spatial relationship update is defined for a different purpose than the PUCCH resource group (i.e., a group for MTRP) of the above-described proposals 1 to 6, and therefore, they may be defined separately from each other. Hereinafter, for convenience of description, the PUCCH group described in proposals 1 to 6 is expressed as a 'group for MTRP', and the PUCCH group described in proposal 7 is expressed as a 'group for spatial relationship'. In consideration of signaling overhead or complexity, a group for MTRP and a group for spatial relationship may be defined as the same group without distinction, but in Proposal 7, it is assumed that each group is set separately, and related methods are proposed.

When the number of groups for TRP and the number of groups for spatial relationship are different, it is necessary to determine how the two groups should be mapped. For example, when M TRPs participate in the cooperative transmission, the number of groups for TRP may be set to M, and the number of groups for spatial relationship may be set to N. In this case, the mapping method of the two groups is proposed as follows. In the proposed methods to be described later, it is assumed that the number of groups for TRP is set/defined as M and the number of groups for spatial relation is set/defined as N.

Method 7-1) The base station may instruct/configure the UE by regrouping the N spatial relationship groups into M upper groups (i.e., MTRP groups). For example, when N=4, M=2, among groups 0/1/2/3 for 4 spatial relationships, group 0,1 may be set as one upper group 0 and group 2,3 may be set as one upper group 1. The upper groups 0 and 1 may be used to transmit control information of different TRPs, respectively. That is, the upper groups 0 and 1 may be a group for MTRP.

In order to additionally reduce signaling overhead, how N groups are mapped to M upper groups may be fixedly determined according to N, M combinations. For example, when N=3 and M=2, the upper group 0 may be mapped to group 0,1 and the upper group 1 may be mapped to group 2 (or group 0,1 is mapped to upper group 0 and, and group 2 may be mapped to upper group 1). For example, when N=4 and M=2, the upper group 0 may be mapped to group 0,1 and the upper group 1 may be mapped to group 2.3 (or group 0,1 is mapped to upper group 0 and, and group 2, 3 may be mapped to upper group 1). Alternatively, how the N groups are mapped to the M upper groups may be determined according to a predetermined rule. For example, the predetermined rule/fixed rule related to the mapping may be previously established/defined between the UE and the base station. For example, group n is mapped to an upper group (n modulo M). At this time, n=0 to N−1 and m=0 to M−1.

Method 7-2) The base station may select M groups (i.e., a group for MTRP) among the N spatial relationship groups and instruct the UE. For example, when N=4 and M=2, the base station may select groups 0 and 1 from among group 0/1/2/3 and configure/instruct the UE as a group for MTRP. Groups 0 and 1 may be used as a group for spatial relationship and as a group for MTRP. Groups 2 and 3 may only be used for groups for spatial relationships.

To this end, the group for the spatial relationship may be preset, and the base station may select and indicate a group for MTRP among them.

In order to additionally reduce the signaling overhead, how M groups among N groups are selected may be fixedly determined according to N, M combinations. How M groups among the N groups are mapped may be determined according to a predetermined rule. For example, the predetermined rule/fixed rule related to the mapping may be previously set/defined between the UE and the base station.

For example, M groups may be selected in the order of the lowest index group to the lowest index group. (On the contrary, it may be selected in order of highest index group to highest index group). The M groups selected by the base station may be used for a group for MTRP as well as a group for spatial relationship. The remaining groups not selected by the base station may be used only for the group for spatial relationship.

Since the PUCCH resource group for the spatial relationship can be configured even in a single TRP, it may be preferable that N be set to M or more, and as a result, the base station may set N to M or more.

In addition, since the PUCCH resource group for the spatial relationship may be used for single TRP transmission instead of the M-TRP transmission, even if a PUCCH resource group for spatial relationship is configured, the group may not be used as a group for MTR of proposals 1 to 6. That is, it may not be used for PUCCH resource selection of UCI multiplexing/UCI piggyback/PRI for the M-TRP transmission.

For example, if the PUCCH resource group is configured for the UE but the M-TRP transmission method is not configured, the PUCCH resource group is used only for the indication of the spatial relationship and the PUCCH resource selection of UCI multiplexing/UCI piggyback/PRI does not use the PUCCH resource group, and may be determined in the same way as the existing Rel-15. For example, when (plural) CORESET groups are configured or multiple dataScramblingIdentityPDSCHs for PDSCH scrambling are configured, the UE may determine that the M-TRP transmission scheme is configured, otherwise, the UE may determine that the M-TRP transmission scheme is not set.

FIG. 11 shows signaling in which a UE receives a single DCI (i.e., one TRP transmits a DCI to the UE) when there are M-TRPs (or M-cells; hereinafter, all TRPs can be replaced with cells, or it may be assumed that there are M-TRPs also when a plurality of CORESETs(/CORESET groups) from one TRP are configured). FIG. 11 is only an example for convenience of description, and does not limit the technical scope of the present disclosure. Some step(s) illustrated in FIG. 11 may be omitted depending on circumstances and/or settings.

Although the following description will be given with respect to "TRP", "TRP" may be replaced with other expressions such as a panel, an antenna array, a cell (e.g., macro cell/small cell/pico cell), a TP (transmission point), and a base station (gNB). Also, as described above, the TRPs may be divided according to information (e.g., index, ID) on a CORESET group (or CORESET pool). For example, if one UE is configured to perform transmission and reception to and from multiple TRPs (or cells), this may mean that multiple CORESET groups (or CORESET pools) are configured for one UE. Such a configuration for CORESET groups (or CORESET pools) may be performed through higher layer signaling (e.g., RRC signaling).

Referring to FIG. 11, for convenience of description, signaling between two TRPs and a UE is considered, but of course, the signaling method may be extended and applied to multiple TRPs and signaling between multiple UEs. In the following description, the network side may be one base station including a plurality of TRPs, and may be one Cell including a plurality of TRPs. As an example, an ideal/non-ideal backhaul may be configured between TRP 1 and TRP 2 constituting the network side. In addition, the following description will be described based on a plurality of TRPs, which may be equally extended and applied to transmission through a plurality of panels. In addition, in this document, the operation of the UE receiving a signal from TRP1/TRP2 may also be interpreted/described (or operated) as an operation for the UE to receive a signal from the network side (via/using TRP1/2), the operation in which the UE transmits a signal to TRP1/TRP2 may be interpreted/explained (or operated) as an operation in which the UE transmits a signal (via/using TRP1/TRP2) to the network side, and vice versa may also be interpreted/described.

The UE may receive configuration information related to multiple TRP-based transmission and reception through/using TRP 1 (and/or TRP 2) from a network side (S1105). That is, the network side may transmit configuration information related to multiple TRP transmission and reception to the UE through/using TRP 1 (and/or TRP 2) (S1105). The configuration information may include information related to the configuration of the network side (i.e., TRP configuration), resource information related to multiple TRP-based transmission and reception (resource allocation), and so on. The configuration information may be delivered through higher-layer signaling (e.g., RRC signaling, MAC-CE, etc.). Also, if the configuration information is predefined or preset, the corresponding step may be omitted.

For example, the configuration information may include CORESET-related configuration information (for example, ControlResourceSet IE) as described in the above-described methods (for example, proposal 1/proposal 2/proposal 3/proposal 4/proposal 5/proposal 6/proposal 7, etc.). The CORESET-related configuration information may include a CORESET-related ID (for example, controlResourceSetID), an index of the CORESET pool for CORESET (for example, CORESETPoolIndex), a time/frequency resource configuration of CORESET, CORESET-related TCI information, and the like. The index of the CORESET pool (for example, CORESETPoolIndex) may mean a specific index mapped/set to each CORESET (e.g., CORESET group Index, HARQ Codebook index). For example, if the index (for example, CORESETPoolIndex) of the CORESET pool corresponding to a specific CORESET is not indicated/set, the UE may assume that index 0 (for example, CORESETPoolIndex=0) is allocated to the corresponding CORESET.

For example, the configuration information may include the configuration information related to the PUCCH transmission described in the above-described proposal method (for example, proposal 1/proposal 2/proposal 3/proposal 4/proposal 5/proposal 6/proposal 7, etc.), configuration information for PUCCH (resource) group for MTRP, information related to PUCCH resource group for spatial relationship, and the like. In addition, the configuration information is provided when a collision (overlapping) occurs in PUCCH resources of UCIs (e.g., UCI1/UCI2, etc.) to be transmitted to different TRPs, respectively, and/or when a PUSCH to be transmitted to different TRPs collides (overlaps) with a PUSCH, the configuration information may include the information related to a priority rule (dropping rule) for each applicable UCI type (content/type).

For example, the configuration information may include information on the number of PUCCH resource groups for spatial relationship and the number of PUCCH resource groups for MTRP. For example, the number of PUCCH resource groups for the spatial relationship and the number of PUCCH resource groups for the MTRP may be different, and the configuration information may include mapping relationship information of a PUCCH resource group for the spatial relationship and a PUCCH resource group for the MTRP. For example, it may be mapped by grouping the PUCCH resource group for the spatial relationship into a higher group corresponding to the PUCCH resource group for the MTRP. For example, a PUCCH group indicated/configured based on information on the PUCCH resource group for the MTRP may also be used as a PUCCH group for a spatial relationship.

For example, the configuration information may include configuration or the like related to PDCCH/PDSCH/

PUCCH/PUSCH and the like as described in the above-described methods (for example, proposal 1/proposal 2/proposal 3/proposal 4/proposal 5/proposal 6/proposal 7, etc.).

For example, in the above step S1105, an operation in which the UE (100/200 of FIGS. 14 to 18) receives configuration information related to the multiple TRP-based transmission and reception from the network side (100/200 of FIGS. 14 to 18) may be implemented by an apparatus of FIGS. 14 to 18 to be described below. For example, referring to FIG. 15, one or more processors 102 may control one or more transceivers 106 and/or one or more memories 104 to receive the configuration information related to the multiple TRP-based transmission and reception, and one or more transceivers 106 may receive the configuration information related to the multiple TRP-based transmission and reception from the network side.

Similarly, in the above step S1105, an operation in which the network side (100/200 of FIGS. 14 to 18) transmits configuration information related to the multiple TRP-based transmission and reception to the UE (100/200 of FIGS. 14 to 18) may be implemented by an apparatus of FIGS. 14 to 18 to be described below. For example, referring to FIG. 15, one or more processors 102 may control one or more transceivers 106 and/or one or more memories 104 to transmit the configuration information related to the multiple TRP-based transmission and reception, and the configuration information related to the multiple TRP-based transmission and reception is transmitted, by one or more transceivers 106, from the network side.

The UE may receive DCI 1 and Data 1 scheduled by the corresponding DCI 1 through/using TRP 1 from the network side (S1110-1). In addition, the UE may receive DCI 2 and Data 2 scheduled by the corresponding DCI 2 through/using TRP 2 from the network side (S1110-2). That is, the network side may transmit DCI 1 and Data 1 scheduled by the corresponding DCI 1 through/using TRP 1 to the UE (S1110-1). In addition, the network side may transmit DCI 2 and Data 2 scheduled by the corresponding DCI 2 through/using TRP 2 to the UE (S1110-2). For example, DCI (e.g., DCI 1, DCI 2) and Data (e.g., Data 1, Data 2) may be transmitted through a control channel (e.g., PDCCH, etc.) and a data channel (e.g., PDSCH, etc.), respectively. In addition, steps S1310-1 and S1310-2 may be performed simultaneously or one may be performed earlier than the other.

For example, as described in the above method (for example, proposal 1/proposal 2/proposal 3/proposal 4/proposal 5/proposal 6/proposal 7, etc.), the DCI 1 and/or the DCI 2 may be transmitted/received through the PDCCH, and may include scheduling information for a PDSCH for transmission/reception of the Data 1 and/or the Data 2 For example, as described in the above method (for example, proposal 1/proposal 2/proposal 3/proposal 4/proposal 5/proposal 6/proposal 7, etc.), the DCI 1 and/or the DCI 2 may be detected/received in the CORESET to which a specific index (for example, CORESETPoolIndex) is mapped/set.

For example, the DCI 1/DCI 2 may include indication information or the like related to PUCCH transmission described in the above-described proposal method (for example, proposal 1/proposal 2/proposal 3/proposal 4/proposal 5/proposal 6/proposal 7, etc.) and the like. As an example, the DCI 1/DCI 2 may include scheduling information/indication information, etc. in relation to specific UCI transmission. As an example, the DCI 1/DCI 2 may include information or the like related to selection/indication of a PUCCH resource (PUCCH Resource Indicator, PRI). The DCI 1/DCI 2 may be related to a specific CORESET group. That is, the DCI 1/DCI 2 may be received through CORESETs corresponding to different CORESETPoolIndexes. For example, the UE may assume that DCI of NCJT PDSCHs is received only in the USS and/or is received only in DCI format 1-1.

For example, the operation of the UE (100/200 in FIGS. 14 to 18) of step S1110-1/S1110-2 described above receiving the DCI 1 and/or the DCI from the network side (100/200 in FIGS. 14 to 18) and/or the Data 1 and/or the Data2 from the network side (100/200 in FIGS. 14 to 18) may be implemented by the apparatus of FIGS. 14 to 18 to be described below. For example, referring to FIG. 15, one or more processors 102 may control one or more transceivers 106 and/or one or more memories 104 or the like to receive the DCII and/or the DCI 2 and/or the Data 1 and/or the Data2, and one or more transceivers 106 may receive the DCI1 and/or the DCI 2 and/or the Data 1 and/or the Data2 from the network side.

Similarly, the operation of the network side (100/200 in FIGS. 14 to 18) of step S1110-1/S1110-2 described above transmitting the DCI 1 and/or the DCI and/or the Data 1 and/or the Data2 to the UE (100/200 in FIGS. 14 to 18) may be implemented by the apparatus of FIGS. 14 to 18 to be described below. For example, referring to FIG. 15, one or more processors 102 may control one or more transceivers 106 and/or one or more memories 104 or the like to transmit the DCII and/or the DCI 2 and/or the Data 1 and/or the Data2, and one or more transceivers 106 may transmit the DCI1 and/or the DCI 2 and/or the Data 1 and/or the Data2 to the UE.

The UE may decode Data 1 and Data 2 received from TRP 1 and TRP 2 (S1115). For example, the UE may perform channel estimation and/or decoding on data based on the above-described method (for example, proposal 1/proposal 2/proposal 3/proposal 4/proposal 5/proposal 6/proposal 7, etc.).

For example, the operation of the UE (100/200 in FIGS. 14 to 18) in step S1115 described above decoding Data 1 and Data 2 by may be implemented by the apparatus of FIGS. 14 to 18, which will be described below. For example, referring to FIG. 15, one or more processors 102 may control one or more memories 104 and the like to perform an operation of decoding the Data 1 and Data 2.

The UE may transmit UL channel 1 through/using TRP 1 to the network side (S1120-1). In addition, the UE may transmit UL channel 2 through/using TRP 2 to the network side (S1120-2). The UL channel 1 and/or the UL channel 2 may be transmitted through the PUCCH or PUSCH.

For example, based on the above-described proposal method (for example, proposal 1/proposal 2/proposal 3/proposal 4/proposal 5/proposal 6/proposal 7, etc.), the UE may transmit the UL channel 1 and/or the UL channel 2 including UCI (e.g., HARQ-ACK information (A/N information), SR, CSI, etc.) to the network side (e.g., TRP 1/TRP 2).

For example, the UE may transmit HARQ-ACK information, SR, and CSI (e.g., semi-persistent CSI, periodic CSI) according to the CORESET group configured for the received DCI. In this case, the UE may transmit the UCI to the TRP 1 and/or TRP 2 based on the corresponding CORESET group. For example, the UE may transmit HARQ-ACK information, SR, CSI in consideration of the PUCCH (resource) group selected by the PUCCH resource selection/indication related information (PUCCH Resource Indicator (PRI)). In this case, the UE may transmit the UCI to the TRP 1 and/or TRP 2 based on the corresponding PUCCH (resource) group.

For example, based on the above-described proposal method (for example, proposal 1/proposal 2/proposal 3/proposal 4/proposal 5/proposal 6/proposal 7, etc.), when the resources for UCIs for different TRPs overlap, the multiplexing or dropping may be applied to transmit UCI.

For example, when PUCCH 1 for UCI transmission to TRP 1 and PUCCH 2 for UCI transmission to TRP 2 overlap, based on priority of UCI contents of PUCCH 1 and UCI contents of PUCCH 2/PUCCH (resource) group index to which the PUCCH resource belongs, the UE may perform UCI transmission for a specific TRP (e.g., TRP 1 or TRP 2).

As an example, when a collision (overlapping) occurs in PUCCH resources of UCIs (e.g., UCI1/UCI2, etc.) to be transmitted to different TRPs, the UE may report the UCI/PUCCH to which the high-priority UCI belongs based on the priority rule (e.g., priority 1/2/3/4 for each UCI type) as in the above-described proposal 3 and drop the rest. Also, as an example, when the priorities of UCIs are the same, the operation may be performed based on operations 1/2/3/4/5/6 or the like of the above-described proposal 3. Alternatively, when the operation 1/2/3/4/5/6 of the above-described proposal 3 is first applied and the priorities are the same, a priority rule for each UCI type (e.g., priority 1/2/3/4 for each UCI type) may also be additionally applied.

As an example, when a PUSCH resource and a PUCCH resource collide (overlapping), the PUCCH (or PUSCH) may be transmitted (or dropped) based on a priority rule (or dropping rule). For example, as in the above-described proposal 3-2, the control information may have a higher priority than data. Alternatively, as in the above-described proposal 3-2, a priority rule (or dropping rule) may be determined based on data included in the PUSCH. Alternatively, the priority rule (or dropping rule) may be determined based on whether the PUCCH repetition is performed.

For example, when the PUCCH (e.g., for TRP 1) transmitting the UCI and the PUSCH transmitting the UCI (UCI piggyback on PUSCH) (e.g., for TRP 2) overlap, the UE may perform PUSCH puncturing/PUSCH drop.

For example, when the UE has multiple panels and supports transmission of multiple UL channels at the same time (same OFDM symbol) through multiple panels, the UE may perform the UCI transmission regardless of the overlapping situation described above.

The UE may configure the A/N codebook based on the above-described proposal method (for example, proposal 1/proposal 2/proposal 3/proposal 4/proposal 5/proposal 6/proposal 7, etc.). For example, the UE may configure the A/N codebook based on the CORESET group index of the CORESET in which the DCI scheduling the PDSCH, which is the target of the A/N, is transmitted. In this case, the A/N for RACH message 4 may always be configured alone. As an example, the UE may configure a joint/separate codebook based on the index set in each CORESET.

As an example, the UE may not expect that the SPS PDSCH release DCI transmitted in CORESETs (or in the same TRP) having an index in the same CORESET and the DCI for scheduling the unicast PDSCH are transmitted in the same slot.

As an example, when the PUCCH transmission time is set in units of sub-slots and PUCCH transmission is possible, the UE allocates PUCCHs of different TRPs to different sub-slots as in the above-described proposal 6, so the TDM transmission may be made within one slot.

For example, when the PUCCH resource group for spatial relation and the PUCCH resource group for TRP are defined/set as the same group as in the above-described proposal 7, if the PUCCH resource group for the spatial relation is used for M-TRP transmission, the above-described methods 1 to 6 may be applied.

For example, the operation of the UE (100/200 in FIGS. X1 to X9) in step S1120-1 and/or S1120-2 described above transmitting the UL channel 1 and/or the UL channel 2 to the network side (100/200 in FIG. X1) may be implemented by the apparatus of X1 to X9 to be described below. For example, referring to FIG. X1, one or more processors 102 may control one or more transceivers 106 and/or one or more memories 104 or the like to transmit the UL channel 1 and/or the UL channel 2, and the one or more transceivers 106 may transmit the UL channel 1 and/or the UL channel 2 to the network side.

Similarly, the operation of the network side (100/200 in FIGS. X1 to X9) in step S1120-1 and/or S1120-2 described above receiving the UL channel 1 and/or the UL channel 2 from the network side (100/200 in FIG. X1) may be implemented by the apparatus of X1 to X9 to be described below. For example, referring to FIG. X1, one or more processors 102 may control one or more transceivers 106 and/or one or more memories 104 or the like to receive the UL channel 1 and/or the UL channel 2, and the one or more transceivers 106 may receive the UL channel 1 and/or the UL channel 2 from the UE.

FIG. 11 illustrates mainly the multi-DCI based M-TRP operation, but can be applied to a single DCI based M-TRP operation, if necessary or desired.

FIG. 12 illustrates an example of an operation flowchart of transmitting uplink control information (UCI) of the UE to which the methods (for example, proposal 1/proposal 2/proposal 3/proposal 4/proposal 5/proposal 6/proposal 7, etc.) proposed in the present disclosure may be applied. The UE may be supported by a plurality of TRPs, and ideal/non-ideal backhaul may be configured between the plurality of TRPs. FIG. 12 is merely for convenience of explanation and does not limit the scope of the present disclosure. Some step(s) illustrated in FIG. 12 may be omitted according to situation and/or configuration.

The following description is given based on "TRP", but as described above, the "TRP" may be applied by being replaced by an expression, such as a panel, an antenna array, a cell (e.g., macro cell/small cell/pico cell, etc.), a transmission point (TP), and a base station (e.g., gNB, etc.). Further, as described above, the TRPs may be distinguished according to information (e.g., index, ID) on CORESET group (or CORESET pool). For example, if one UE is configured to perform transmission and reception with multiple TRPs (or cells), this may mean that multiple CORESET groups (or CORESET pools) are configured to one UE. Such a configuration for the CORESET group (or CORESET pool) may be performed via higher layer signaling (e.g., RRC signaling).

Although not illustrated in FIG. 12, the UE may receive the configuration information. The configuration information may be received through higher layer signaling (for example, RRC or MAC CE, etc.). Also, the operation of receiving the configuration information may be performed before the operation of receiving the first DCI and the second DCI in steps S1210 and S1220. The configuration information may include higher layer configurations described in the above-described methods (for example, proposal 1/proposal 2/proposal 3/proposal 4/proposal 5/proposal 6/proposal 7, etc.).

For example, the configuration information may include CORESET-related configuration information (for example, ControlResourceSet IE). The CORESET-related configuration information may include a CORESET-related ID (for example, controlResourceSetID), an index of the CORESET pool for CORESET (for example, CORESETPoolIndex), a time/frequency resource configuration of CORESET, CORESET-related TCI information, and the like. If the index (for example, CORESETPoolIndex) of the CORESET pool corresponding to a specific CORESET is not indicated/set, the UE may assume that index 0 (for example, CORESETPoolIndex=0) is allocated to the corresponding CORESET.

For example, the configuration information may include information related to a feedback mode of the HARQ-ACK information (for example, ackNackFeedbackMode). The information related to the feedback mode may indicate one of a joint mode or a separate mode, and a HARQ-ACK codebook may be configured based on the indicated mode. As an example, as described in the above-described method (for example, proposal 1/proposal 2/proposal 3/proposal 4/proposal 5/proposal 6/proposal 7, etc.), when the joint mode is indicated, a joint HARQ-ACK codebook is configured and when the separate mode is indicated, a Separated HARQ-ACK codebook may be configured.

For example, the configuration information may include configuration information related to an uplink channel for MTRP (for example, a first uplink channel and a second uplink channel), and resource configuration of an uplink channel (for example, PUCCH-Resourceset, PUCCH). -Resource). A resource group of PUCCH may be configured based on the configuration information. Here, the resource group may be related to one or more PUCCH resource sets. For example, a new parameter may be set to configure the resource group of the PUCCH, or a spatial relationship information-related parameter (for example, PUCCH-spatialRelationInfo) connected to the PUCCH resource may be used.

For example, the TRP may be divided based on the resource group of the PUCCH. Alternatively, the spatial relationship information may be updated for each resource group of PUCCH. That is, the spatial relationship information of PUCCH resources belonging to the same PUCCH resource group may be updated to the same value at once. Alternatively, the resource group of the PUCCH may be related to the panel of the UE.

In addition, the PUCCH resource group for the spatial relationship may be configured based on the configuration information. The PUCCH resource group for the spatial relationship may be configured separately from the PUCCH resource group. For example, a part of the PUCCH resource group for the spatial relationship may be configured as the PUCCH resource group (for example, a group for MTRP). For example, some of the PUCCH resource groups for the spatial relationship may be selected from the group of the lowest (or highest) index and may be configured as the PUCCH resource group (for example, group for MTRP).

The UE may receive first downlink control information (DCI) based on a first control resource set group (S1210). Also, the UE may receive a second DCI based on the second control resource set group (S1220).

As described in the above method (for example, proposal 1/proposal 2/proposal 3/proposal 4/proposal 5/proposal 6/proposal 7, etc.), the control resource set group may include one or more control resource sets (i.e., CORESETs) corresponding to the same CORESETPoolIndex, and may be a concept corresponding to the CORESET pool. Accordingly, receiving each DCI based on different control resource set groups may mean receiving each DCI through the CORESETs corresponding to different CORESETPoolIndexes. That is, the CORESETPoolIndex corresponding to the CORESET in which each DCI is received may be set differently.

For example, when the CORESETPoolIndex (or CORESET group) related to the CORESET through which the first DCI is transmitted and the CORESETPoolIndex (or the CORESET group) related to the CORESET through which the second DCI is transmitted are different, it may be recognized as an M-TRP operation.

The first DCI and the second DCI may be transmitted through a downlink control channel (for example, PDCCH). Each DCI may include a transport block related field, a PUCCH resource indicator (PUCCH resource indicator, PRI) field, and the like. For example, a resource for feedback of HARQ-ACK information may be selected based on the PRI field included in each DCI. For example, a first uplink channel (for example, PUCCH, PUSCH) may be scheduled based on the first DCI, and a second uplink channel (for example, PUCCH, PUSCH) may be scheduled based on the second DCI.

For example, the first DCI and the second DCI may be detected within the USS. For example, the first DCI and the second DCI may correspond to DCI format 1_1. For example, the first DCI and the second DCI may be scrambled with a specific RNTI (for example, C-RNTI, MCS-C-RNTI).

For example, the operation of receiving the first DCI and the second DCI by the UE (100/200 in FIGS. 14 to 18) in steps S1210 and S1220 described above may be implemented by the apparatus of FIGS. 14 to 18 to be described below. For example, referring to FIG. 15, the one or more processors 102 may control one or more transceivers 106 and/or one or more memories 104 to receive the first DCI and the second DCI, and one or more transceivers 106 may receive the first DCI and the second DCI.

The UE may transmit at least one of the first uplink channel and the second uplink channel (S1230). The first uplink channel and the second uplink channel may be physical uplink control channels. Alternatively, the first uplink channel may be a physical uplink control channel, and the second uplink channel may be a physical uplink shared channel.

For example, as described in the above-described method (for example, proposal 1/proposal 2/proposal 3/proposal 4/proposal 5/proposal 6/proposal 7, etc.), based on the overlapping of the resource of the first uplink channel and the resource of the second uplink channel, only one of the first uplink channel or the second uplink channel may be transmitted to the base station. In other words, the first uplink channel or the second uplink channel may be dropped based on the priority rule. The priority rule may be determined based on contents of information included in each uplink channel.

For example, the first uplink channel and the second uplink channel may include uplink control information (UCI). That is, each uplink channel may include at least one of a beam failure recovery request, HARQ-ACK information, a scheduling request, and/or channel state information. These may be referred to as content/type/type of UCI, and the like. For example, the priority may be determined based on the content/type/type of the UCI.

The first uplink channel and the second uplink channel may be physical uplink control channels, and based on the overlapping of the resources of the first uplink channel and the resources of the second uplink channel, the first uplink channel or the second uplink channel may be dropped according to a priority rule.

For example, the priority rule may be indicated in advance or set by the base station. For example, among the contents/types/types of the UCI, the priority of the beam failure recovery request (BFRQ) may be the highest.

By comparing first contents with a highest priority among the contents of information included in the first uplink channel and second contents with a highest priority among the contents of information included in the second uplink channel, an uplink channel including contents related to a higher priority may be transmitted, and an uplink channel including contents related to a lower priority may be dropped.

In other words, after determining the highest priority UCI type (i.e., first content) among the types of UCI included in the first uplink channel and determining the UCI type (i.e., second content) of the highest priority among the types of UCI included in the second uplink channel, the UCI types of the highest priority of each uplink channel are compared (i.e., comparing the priorities of the first content and the second content) to transmit an uplink channel including a UCI type corresponding to a higher priority.

When the priorities of the first contents and the second contents are the same, an uplink channel related to a lower index may be transmitted based on indexes of each control resource set group. Alternatively, an uplink channel having a larger payload size may be transmitted by comparing the payload sizes.

Alternatively, by comparing the number of serving cells related to contents of information included in the first uplink channel with the number of serving cells related to contents of information included in the second uplink channel, uplink channels related to more serving cells are transmitted, and uplink channels related to fewer serving cells may be dropped.

For example, the first uplink channel may be a physical uplink control channel, and the second uplink channel may be a physical uplink shared channel. When the PUCCH resource and the PUSCH resource for different TRP overlap (for example, when the PUCCH resource for TRP 1 and the PUSCH resource for TRP 2 overlap), a channel to be dropped may be determined based on the ratio of overlapping resource areas or the number of resources. For example, when the overlapping resource area is greater than or equal to a specific ratio or a specific number, the second uplink channel (for example, PUSCH) may be dropped. Alternatively, when the second uplink channel includes an SPS PUSCH or RACH related message, the first uplink channel (for example, PUCCH) may be dropped. Alternatively, when the first uplink channel is repeatedly transmitted, the first uplink channel may be dropped.

For example, the operation of transmitting an uplink channel by the UE (100/200 in FIGS. 14 to 18) in step S1230 described above may be implemented by the apparatus of FIGS. 14 to 18 to be described below. For example, referring to FIG. 15, one or more processors 102 may control one or more transceivers 106 and/or one or more memories 104 or the like to transmit the uplink channel, and the one or more transceivers 106 may transmit the uplink channel.

FIG. 13 illustrates an example of an operation flowchart of an uplink channel of a base station (BS) to which methods (for example, proposal 1/proposal 2/proposal 3/proposal 4/proposal 5/proposal 6/proposal 7, etc.) proposed in the present disclosure may be applied. FIG. 13 is merely for convenience of explanation, and does not limit the scope of the present disclosure. In addition, some step(s) illustrated in FIG. 13 may be omitted depending on circumstances and/or settings.

The base station and the UE may collectively refer to an object performing data transmission and reception. For example, the base station may be a concept including one or more transmission points (TPs) and one or more transmission and reception points (TRPs). Also, the TPs and/or TRPs may include the base station's panels, transmission and reception units, etc. Also, as described above, the TRPs may be divided according to information (e.g., index, ID) on a CORESET group (or CORESET pool). For example, if one UE is configured to perform transmission and reception to and from multiple TRPs (or cells), this may mean that multiple CORESET groups (or CORESET pools) are configured for one UE. Such a configuration for CORESET groups (or CORESET pools) may be performed via higher layer signaling (e.g., RRC signaling).

A base station may transmit configuration information to a UE, in S1305. The configuration information may be transmitted through the higher layer signaling (for example, RRC or MAC CE, etc.). The configuration information may include higher layer configurations described in the above-described methods (for example, proposal 1/proposal 2/proposal 3/proposal 4/proposal 5/proposal 6/proposal 7, etc.). When the configuration information is preset, step S1305 may be omitted.

For example, the configuration information may include CORESET-related configuration information (for example, ControlResourceSet IE). The CORESET-related configuration information may include a CORESET-related ID (for example, controlResourceSetID), an index of the CORESET pool for CORESET (for example, CORESETPoolIndex), a time/frequency resource configuration of CORESET, CORESET-related TCI information, and the like. If the index (for example, CORESETPoolIndex) of the CORESET pool corresponding to a specific CORESET is not indicated/set, the UE may assume that index 0 (for example, CORESETPoolIndex=0) is allocated to the corresponding CORESET.

For example, the configuration information may include information related to a feedback mode of the HARQ-ACK information (for example, ackNackFeedbackMode). The information related to the feedback mode may indicate one of a joint mode or a separate mode, and a HARQ-ACK codebook may be configured based on the indicated mode. As an example, as described in the above-described method (for example, proposal 1/proposal 2/proposal 3/proposal 4/proposal 5/proposal 6/proposal 7, etc.), when the joint mode is indicated, a joint HARQ-ACK codebook is configured and when the separate mode is indicated, a Separated HARQ-ACK codebook may be configured.

For example, the configuration information may include configuration information related to an uplink channel for MTRP (for example, a first uplink channel and a second uplink channel), and resource configuration of an uplink channel (for example, PUCCH-Resourceset, PUCCH).-Resource). A resource group of PUCCH may be configured based on the configuration information. Here, the resource group may be related to one or more PUCCH resource sets. For example, a new parameter may be set to configure the resource group of the PUCCH, or a spatial relationship information-related parameter (for example, PUCCH-spatialRelationInfo) connected to the PUCCH resource may be used.

For example, the TRP may be divided based on the resource group of the PUCCH. Alternatively, the spatial relationship information may be updated for each resource group of PUCCH. That is, the spatial relationship information of PUCCH resources belonging to the same PUCCH resource group may be updated to the same value at once. Alternatively, the resource group of the PUCCH may be related to the panel of the UE.

In addition, the PUCCH resource group for the spatial relationship may be configured based on the configuration information. The PUCCH resource group for the spatial relationship may be configured separately from the PUCCH resource group. For example, a part of the PUCCH resource group for the spatial relationship may be configured as the PUCCH resource group (for example, a group for MTRP). For example, some of the PUCCH resource groups for the spatial relationship may be selected from the group of the lowest (or highest) index and may be configured as the PUCCH resource group (for example, group for MTRP).

For example, an operation for the base station (100/200 of FIGS. 14 to 18) of the above-described step S1305 to transmit the configuration information may be implemented by the device of FIGS. 14 to 18 to be described below. For example, referring to FIG. 15, one or more processors 102 may control one or more transceivers 106 and/or one or more memories 104 so as to transmit the configuration information, and the one or more transceivers 106 may transmit the configuration information.

The base station may transmit first downlink control information (DCI) based on a first control resource set group (S1310). Also, the UE may transmit a second DCI based on the second control resource set group (S1320).

As described in the above method (for example, proposal 1/proposal 2/proposal 3/proposal 4/proposal 5/proposal 6/proposal 7, etc.), the control resource set group may include one or more control resource sets (ie, CORESETs) corresponding to the same CORESETPoolIndex, and may be a concept corresponding to the CORESET pool. Accordingly, transmitting each DCI based on different control resource set groups may mean transmitting each DCI through the CORESETs corresponding to different CORESETPoolIndexes. That is, the CORESETPoolIndex corresponding to the CORESET in which each DCI is transmitted may be set differently.

For example, when the CORESETPoolIndex (or CORESET group) related to the CORESET through which the first DCI is transmitted and the CORESETPoolIndex (or the CORESET group) related to the CORESET through which the second DCI is transmitted are different, the UE may be recognized as an M-TRP operation.

The first DCI and the second DCI may be transmitted through a downlink control channel (for example, PDCCH). Each DCI may include a transport block related field, a PUCCH resource indicator (PUCCH resource indicator, PRI) field, and the like. For example, a resource for feedback of HARQ-ACK information may be selected based on the PRI field included in each DCI. For example, a first uplink channel (for example, PUCCH, PUSCH) may be scheduled based on the first DCI, and a second uplink channel (for example, PUCCH, PUSCH) may be scheduled based on the second DCI.

For example, the first DCI and the second DCI may be detected within the USS. For example, the first DCI and the second DCI may correspond to DCI format 1_1. For example, the first DCI and the second DCI may be scrambled with a specific RNTI (for example, C-RNTI, MCS-C-RNTI).

For example, an operation for the base station (100/200 of FIGS. 14 to 18) of the above-described step S1305 to transmit the configuration information may be implemented by the device of FIGS. 14 to 18 to be described below. For example, referring to FIG. 15, one or more processors 102 may control one or more transceivers 106 and/or one or more memories 104 so as to transmit the configuration information, and the one or more transceivers 106 may transmit the configuration information.

The base station may receive at least one of the first uplink channel and the second uplink channel (S1330). The first uplink channel and the second uplink channel may be physical uplink control channels. Alternatively, the first uplink channel may be a physical uplink control channel, and the second uplink channel may be a physical uplink shared channel.

For example, as described in the above-described method (for example, proposal 1/proposal 2/proposal 3/proposal 4/proposal 5/proposal 6/proposal 7, etc.), based on the overlapping of the resource of the first uplink channel and the resource of the second uplink channel, only one of the first uplink channel or the second uplink channel may be transmitted to the base station. In other words, the first uplink channel or the second uplink channel may be dropped based on the priority rule. The priority rule may be determined based on contents of information included in each uplink channel.

For example, the first uplink channel and the second uplink channel may include uplink control information (UCI). That is, each uplink channel may include at least one of a beam failure recovery request, HARQ-ACK information, a scheduling request, and/or channel state information. These may be referred to as content/type/type of UCI, and the like. For example, the priority may be determined based on the content/type/type of the UCI.

The first uplink channel and the second uplink channel may be physical uplink control channels, and based on the overlapping of the resources of the first uplink channel and the resources of the second uplink channel, the first uplink channel or the second uplink channel may be dropped according to a priority rule.

For example, the priority rule may be indicated in advance or set by the base station. For example, among the contents/types/types of the UCI, the priority of the beam failure recovery request (BFRQ) may be the highest.

By comparing first contents with a highest priority among the contents of information included in the first uplink channel and second contents with a highest priority among the contents of information included in the second uplink channel, an uplink channel including contents related to a higher priority may be transmitted, and an uplink channel including contents related to a lower priority may be dropped.

In other words, after determining the highest priority UCI type (i.e., first content) among the types of UCI included in the first uplink channel and determining the UCI type (i.e., second content) of the highest priority among the types of UCI included in the second uplink channel, the UCI types of the highest priority of each uplink channel are compared (i.e., comparing the priorities of the first content and the second content) to transmit an uplink channel including a UCI type corresponding to a higher priority.

When the priorities of the first contents and the second contents are the same, an uplink channel related to a lower index may be transmitted based on indexes of each control resource set group. Alternatively, an uplink channel having a larger payload size may be transmitted by comparing the payload sizes.

Alternatively, by comparing the number of serving cells related to contents of information included in the first uplink channel with the number of serving cells related to contents of information included in the second uplink channel, uplink channels related to more serving cells are transmitted, and uplink channels related to fewer serving cells may be dropped.

For example, the first uplink channel may be a physical uplink control channel, and the second uplink channel may be a physical uplink shared channel. When the PUCCH resource and the PUSCH resource for different TRP overlap (for example, when the PUCCH resource for TRP 1 and the PUSCH resource for TRP 2 overlap), a channel to be dropped may be determined based on the ratio of overlapping resource areas or the number of resources. For example, when the overlapping resource area is greater than or equal to a specific ratio or a specific number, the second uplink channel (for example, PUSCH) may be dropped. Alternatively, when the second uplink channel includes an SPS PUSCH or RACH related message, the first uplink channel (for example, PUCCH) may be dropped. Alternatively, when the first uplink channel is repeatedly transmitted, the first uplink channel may be dropped.

For example, the operation of receiving an uplink channel by the UE (100/200 in FIGS. 14 to 18) in step S1330 described above may be implemented by the apparatus of FIGS. 14 to 18 to be described below. For example, referring to FIG. 15, one or more processors 102 may control one or more transceivers 106 and/or one or more memories 104 or the like to receive the uplink channel, and the one or more transceivers 106 may receive the uplink channel.

As described above, the above-described network side (or base station)/UE signaling and operation (e.g., proposal 1/2/3/4/5/6/7/FIGS. 11/12/13, etc.) may be implemented by the apparatus (e.g., FIGS. 14 to 18) to be described below. For example, the network side (or base station) (e.g., TRP 1/TRP 2) may correspond to the first wireless device, the UE may correspond to the second wireless device, and vice versa may be considered in some cases. For example, the first device (e.g., TRP 1)/the second device (e.g., TRP 2) may correspond to the first wireless device, the UE may correspond to the second wireless device, and vice versa may be considered in some cases.

For example, the above-described Network side (or base station)/UE signaling and operation (eg proposal 1/2/3/4/5/6/7/FIGS. 11/12/13, etc.) may be processed by one or more processors of FIGS. 14 to 18 (e.g., 102, 202), and the above-described network side (or base station)/UE signaling and operation (e.g., proposal 1/2/3/4/5/6/7/FIGS. 11/12/13, etc.) may be stored in one or more memories (e.g., 104 and 204) in the form of instructions/programs (e.g., instruction, executable code) for driving at least one processors (e.g., 102 and 202) of FIGS. 14 to 18.

For example, a device includes one or more memories and one or more processors functionally connected to the one or more memories, in which the one or more processors control the device to receive first downlink control information (DCI) based on a first control resource set group, in which a first uplink channel is scheduled based on the first DCI; receive a second DCI based on a second control resource set group, in which a second uplink channel is scheduled based on the second DCI; and transmit only one of the first uplink channel and the second uplink channel based on overlapping of a resource of the first uplink channel and a resource of the second uplink channel, in which the first uplink channel or the second uplink channel may be dropped based on a priority rule, and a priority of the priority rule may be determined based on contents of information included in each uplink channel.

As another example, one or more non-transitory computer-readable media store one or more instructions, in which the one or more instructions executable by the one or more processors includes an instruction that instructs a user equipment (UE) to: receive first downlink control information (DCI) based on a first control resource set group, in which a first uplink channel is scheduled based on the first DCI; receive a second DCI based on a second control resource set group, in which a second uplink channel is scheduled based on the second DCI; and transmit only one of the first uplink channel and the second uplink channel based on overlapping of a resource of the first uplink channel and a resource of the second uplink channel, in which the first uplink channel or the second uplink channel may be dropped based on a priority rule, and a priority of the priority rule may be determined based on contents of information included in each uplink channel.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 14 illustrates a communication system applied to the present disclosure.

Referring to FIG. 14, a communication system applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 1010a, vehicles 1010b-1 and 1010b-2, an eXtended Reality (XR) device 1010c, a hand-held device 1010d, a home appliance 1010e, an Internet of Things (IoT) device 1010f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The handheld device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 1010a to 1010f may be connected to the network 300 via the BSs 1020. An AI technology may be applied to the wireless devices 1010a to 1010f and the wireless devices 1010a to 1010f may be connected to the AI server 400 via the network 300. The network 300 may be configured using a 3G network, a 4G (e.g., LTE) network, or a 5G (e.g., NR) network. Although the wireless devices 1010a to 1010f may communicate with each other through the BSs 1020/network 300, the wireless devices 1010*a* to 1010*f* may perform direct communication (e.g., sidelink communication) with each other without passing through the BSs/network. For example, the vehicles 1010*b*-1 and 1010*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 1010*a* to 1010*f*.

Wireless communication/connections 150*a*, 150*b*, or 150*c* may be established between the wireless devices 1010*a* to 1010*f*/BS 1020, or BS 1020/BS 1020. Herein, the wireless communication/connections may be established through various RATs (e.g., 5G NR) such as uplink/downlink communication 150*a*, sidelink communication 150*b* (or, D2D communication), or inter BS communication (e.g., Relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Wireless Devices Applicable to the Present Disclosure

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 1010*x* and the BS 1020} and/or {the wireless device 1010*x* and the wireless device 1010*x*} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage medium, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to Which Disclosure is Applied

FIG. 16 illustrates a signal processing circuit for a transmit signal.

Referring to FIG. 16, a signal processing circuit 1000 may include a scrambler 1010, a modulator 1020, a layer mapper 1030, a precoder 1040, a resource mapper 1050, and a signal generator 1060. Although not limited thereto, an operation/function of FIG. 16 may be performed by the processors 102 and 202 and/or the transceivers 106 and 206 of FIG. 15. Hardware elements of FIG. 16 may be implemented in the processors 102 and 202 and/or the transceivers 106 and 206 of FIG. 15. For example, blocks 1010 to 1060 may be implemented in the processors 102 and 202 of FIG. 15. Further, blocks 1010 to 1050 may be implemented in the processors 102 and 202 of FIG. 15 and the block 1060 may be implemented in the transceivers 106 and 206 of FIG. 15.

A codeword may be transformed into a radio signal via the signal processing circuit 1000 of FIG. 16. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 1010. A scramble sequence used for scrambling may be generated based on an initialization value and the initialization value may include ID information of a wireless device. The scrambled bit sequence may be modulated into a modulated symbol sequence by the modulator 1020. A modulation scheme may include pi/2-BPSK(pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 1030. Modulated symbols of each transport layer may be mapped to a corresponding antenna port(s) by the precoder 1040 (precoding). Output z of the precoder 1040 may be obtained by multiplying output y of the layer mapper 1030 by precoding matrix W of N*M. Here, N represents the number of antenna ports and M represents the number of transport layers. Here, the precoder 1040 may perform precoding after performing transform precoding (e.g., DFT transform) for complex modulated symbols. Further, the precoder 1040 may perform the precoding without performing the transform precoding.

The resource mapper 1050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 1060 may generate the radio signal from the mapped modulated symbols and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (1010 to 1060) of FIG. 16. For example, the wireless device (e.g., 100 or 200 of FIG. 15) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder.

Example of a Wireless Device Applied to the Disclosure

FIG. 17 illustrates another example of a wireless device applied to the disclosure. The wireless device may be implemented in various forms according to a use-case/service (refer to FIG. 14).

Referring to FIG. 17, wireless devices 1010 and 1020 may correspond to the wireless devices 100 and 200 of FIG. 15 and may be configured by various elements, components, units/portions, and/or modules. For example, each of the wireless devices 1010 and 2010 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 15. For example, the transceiver(s) 114 may include the one or more transceivers 106 and 106 and/or the one or more antennas 108 and 108 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (1010*a* of FIG. 14), the vehicles (1010*b*-1 and 1010*b*-2 of FIG. 14), the XR device (1010*c* of FIG. 14), the hand-held device (1010*d* of FIG. 14), the home appliance (1010*e* of FIG. 14), the IoT device (1010*f* of FIG. 14), a digital broadcast terminal, a hologram device, a public safety device, an MTC device, a medicine device, a fintech device (or a finance device), a security device, a climate/environment device, the AI server/device (400 of FIG. 14), the BSs (1020 of FIG. 14), a network node, etc. The wireless device may be used in a mobile or fixed place according to a use-example/service.

In FIG. 17, the entirety of the various elements, components, units/portions, and/or modules in the wireless devices 100 and 100 may be connected to each other through a wired interface or at least a part thereof may be wirelessly connected through the communication unit 110. For example, in each of the wireless devices 100 and 100, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 100 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to Which Disclosure is Applied

FIG. 18 illustrates a portable device applied to the disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (VVT).

Referring to FIG. 18, a portable device 1010 may include an antenna unit 108, a communication unit 110, a control unit 120, a memory unit 130, a power supply unit 140*a*, an interface unit 140*b*, and an input/output unit 140*c*. The antenna unit 108 may be configured as a part of the communication unit 110. The blocks 110 to 130/140*a* to 140*c* correspond to the blocks 110 to 130/140 of FIG. 17, respectively.

The communication unit 110 may transmit/receive a signal (e.g., data, a control signal, etc.) to/from another wireless device and eNBs. The control unit 120 may perform various operations by controlling components of the portable device 1010. The control unit 120 may include an Application Processor (AP). The memory unit 130 may store data/parameters/programs/codes/instructions required for driving the portable device 1010. Further, the memory unit 130 may store input/output data/information, etc. The power supply unit 140*a* may supply power to the portable device 1010 and include a wired/wireless charging circuit, a battery, and the like. The interface unit 140*b* may support a connection between the portable device 1010 and another external device. The interface unit 140*b* may include various ports (e.g., an audio input/output port, a video input/output port) for the connection with the external device. The input/output unit 140*c* may receive or output a video information/signal, an audio information/signal, data, and/or information input from a user. The input/output unit 140*c* may include a camera, a microphone, a user input unit, a display unit 140*d*, a speaker, and/or a haptic module.

As one example, in the case of data communication, the input/output unit 140*c* may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

Here, the wireless communication technology implemented in the wireless devices 100 and 200 of the present disclosure may include a narrowband Internet of Things for low-power communication as well as LTE, NR, and 6G. In this case, for example, NB-IoT technology may be an example of low power wide area network (LPWAN) technology, and may be implemented in standards such as LTE Cat NB1 and/or LTE Cat NB2, and is limited to the above-described names. Additionally or alternatively, the wireless communication technology implemented in the wireless devices 100 and 200 of the present disclosure may perform communication based on LTE-M technology. In this case, as an example, the LTE-M technology may be an example of an LPWAN technology, and may be called by various names such as enhanced machine type communication (eMTC). For example, the TE-M technology may be implemented in at least one of various standards of 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 100 and 200 of the present disclosure may include at least one of ZigBee, Bluetooth, and Low Power Wide Area Network (LPWAN) considering low power communication, and is not limited to the above-described name. For example, the ZigBee technology may create personal area networks (PANs) related to small/low-power digital communication based on various standards such as IEEE 802.15.4, and may be called by various names.

The embodiments described above are implemented by combinations of components and features of the disclosure in predetermined forms. Each component or feature should be considered selectively unless specified separately. Each component or feature may be carried out without being combined with another component or feature. Moreover, some components and/or features are combined with each other and may implement embodiments of the disclosure. The order of operations described in embodiments of the disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the disclosure may be implemented by various means, for example, hardware, firmware, software, or combinations thereof. When embodiments are implemented by hardware, one embodiment of the disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the disclosure may be embodied in other specific forms without departing from essential features of the disclosure. Accordingly, the aforementioned detailed description should not be construed as limiting in all aspects and should be considered as illustrative. The scope of the disclosure should be determined by rational construing of the appended claims, and all modifications within an equivalent scope of the disclosure are included in the scope of the disclosure.

INDUSTRIAL AVAILABILITY

Although the method of transmitting and receiving uplink channel in the wireless communication system of the present disclosure has been described in connection with examples in which it applies to 3GPP LTE/LTE-A system and 5G systems (new RAT systems), the method is also applicable to other various wireless communication systems.

The invention claimed is:

1. A method of transmitting an uplink channel by a user equipment (UE) in a wireless communication system, the method comprising:
   receiving first downlink control information (DCI) based on a first control resource set group;
   wherein a first uplink channel is scheduled based on the first DCI;
   receiving second DCI based on a second control resource set group;
   wherein a second uplink channel is scheduled based on the second DCI; and
   transmitting only one of the first uplink channel and the second uplink channel based on overlapping of a resource of the first uplink channel and a resource of the second uplink channel,
   wherein the first uplink channel or the second uplink channel is dropped based on a priority rule, and
   a priority of the priority rule is determined based on contents of information included in each uplink channel.

2. The method of claim 1, wherein the first uplink channel and the second uplink channel are physical uplink control channels.

3. The method of claim 2, wherein by comparing first contents with a highest priority among contents of information included in the first uplink channel and second contents with a highest priority among contents of information included in the second uplink channel, an uplink channel including contents related to a higher priority is transmitted, and an uplink channel including contents related to a lower priority is dropped.

4. The method of claim 3, wherein, based on the priorities of the first contents and the second contents being the same, an uplink channel related to a lower index is transmitted based on indexes of each control resource set group.

5. The method of claim 2, wherein by comparing the number of serving cells related to contents of information included in the first uplink channel with the number of serving cells related to contents of information included in the second uplink channel, uplink channels related to more serving cells are transmitted, and uplink channels related to fewer serving cells are dropped.

6. The method of claim 2, wherein each uplink channel includes at least one of a beam failure recovery request, HARQ-ACK information, a scheduling request, and/or channel state information.

7. The method of claim 6, wherein the beam failure recovery request has a highest priority.

8. The method of claim 2, further comprising:
receiving configuration information related to the first uplink channel and the second uplink channel,
wherein a resource group of a PUCCH is configured based on the configuration information, and
the resource group is related to one or more PUCCH resource sets.

9. The method of claim 1, wherein the first uplink channel is a physical uplink control channel, and the second uplink channel is a physical uplink shared channel.

10. The method of claim 9, wherein the second uplink channel is dropped based on the overlapped resource area being greater than or equal to a predetermined ratio or a predetermined number.

11. The method of claim 9, wherein the first uplink channel is dropped based on the second uplink channel including an SPS PUSCH or RACH related message.

12. The method of claim 9, wherein the first uplink channel is dropped based on the first uplink channel being repeatedly transmitted.

13. A user equipment (UE) transmitting an uplink channel in a wireless communication system, the UE comprising:
one or more transceivers;
one or more processors; and
one or more memories configured to store instructions for operations executed by the one or more processors and be connected to the one or more processors,
wherein the operations include
receiving first downlink control information (DCI) based on a first control resource set group;
wherein a first uplink channel is scheduled based on the first DCI;
receiving second DCI based on a second control resource set group;
wherein a second uplink channel is scheduled based on the second DCI; and
transmitting only one of the first uplink channel and the second uplink channel based on overlapping of a resource of the first uplink channel and a resource of the second uplink channel,
wherein the first uplink channel or the second uplink channel is dropped based on a priority rule, and
a priority of the priority rule is determined based on contents of information included in each uplink channel.

14. The UE of claim 13, wherein the first uplink channel and the second uplink channel are physical uplink control channels.

15. The UE of claim 14, wherein by comparing first contents with a highest priority among the contents of information included in the first uplink channel and second contents with a highest priority among the contents of information included in the second uplink channel, an uplink channel including contents related to a higher priority is transmitted, and an uplink channel including contents related to a lower priority is dropped.

16. The UE of claim 14, wherein by comparing the number of serving cells related to contents of information included in the first uplink channel with the number of serving cells related to contents of information included in the second uplink channel, uplink channels related to more serving cells are transmitted, and uplink channels related to fewer serving cells are dropped.

17. A device including one or more memories and one or more processors functionally connected to the one or more memories, wherein
the one or more processors control the device to
receive first downlink control information (DCI) based on a first control resource set group, wherein a first uplink channel is scheduled based on the first DCI;
receive a second DCI based on a second control resource set group, wherein a second uplink channel is scheduled based on the second DCI; and
transmit only one of the first uplink channel and the second uplink channel based on overlapping of a resource of the first uplink channel and a resource of the second uplink channel,
wherein the first uplink channel or the second uplink channel is dropped based on a priority rule, and
a priority of the priority rule is determined based on contents of information included in each uplink channel.

* * * * *